US012781484B2

(12) United States Patent
Heuer et al.

(10) Patent No.: US 12,781,484 B2
(45) Date of Patent: Nov. 3, 2026

(54) PIVOTING SPRAY HEAD FAUCET

(71) Applicant: ASSA ABLOY Americas Residential Inc., New Haven, CT (US)

(72) Inventors: Darin Heuer, Anaheim Hills, CA (US); Adam William Tracy, Irvine, CA (US); Jan van Leyen, Mission Viejo, CA (US); Brad Callahan, Middleton, WI (US); Evan Alan Benstead, Los Angeles, CA (US)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 11 days.

(21) Appl. No.: 19/177,876

(22) Filed: Apr. 14, 2025

(65) Prior Publication Data

US 2025/0305259 A1 Oct. 2, 2025

Related U.S. Application Data

(63) Continuation of application No. 18/403,956, filed on Jan. 4, 2024, now Pat. No. 12,297,630, which is a continuation of application No. 17/949,301, filed on Sep. 21, 2022, now Pat. No. 11,905,691.

(60) Provisional application No. 63/246,327, filed on Sep. 21, 2021.

(51) Int. Cl.
*E03C 1/04* (2006.01)
*F16L 27/08* (2006.01)

(52) U.S. Cl.
CPC ........ *E03C 1/0404* (2013.01); *F16L 27/0808* (2013.01); *E03C 2001/0414* (2013.01); *Y10T 137/9464* (2015.04)

(58) Field of Classification Search
CPC ............. Y10T 137/9464; E03C 1/0404; E03C 2001/0414; F16L 27/0808
USPC .......................................................... 137/801
See application file for complete search history.

(56) References Cited

U.S. PATENT DOCUMENTS

| | | | |
|---|---|---|---|
| 2,776,168 | A | 1/1957 | Schweda |
| 4,013,230 | A | 3/1977 | Gondek |
| 4,752,975 | A | 6/1988 | Yates |
| 5,146,639 | A | 9/1992 | Krause |
| 7,246,760 | B2 | 7/2007 | Marty et al. |
| 7,472,846 | B2 | 1/2009 | Thomas et al. |
| 7,607,588 | B2 | 10/2009 | Nobili |
| 8,056,836 | B2 | 11/2011 | Chen et al. |
| 8,070,076 | B2 | 12/2011 | Erickson et al. |

(Continued)

FOREIGN PATENT DOCUMENTS

| | | | |
|---|---|---|---|
| CN | 203979720 | U | 12/2014 |
| CN | 204523378 | U | 8/2015 |

(Continued)

OTHER PUBLICATIONS

PCT International Search Report and Written Opinion in Application PCT/US2022/076762, mailed Jan. 13, 2023, 11 pages.
PCT International Preliminary Report on Patentability in Application PCT/US2022/076762, mailed Apr. 4, 2024, 8 pages.

*Primary Examiner* — Daphne M Barry
(74) *Attorney, Agent, or Firm* — Merchant & Gould P.C.

(57) ABSTRACT

A pivotable spray head for connection to a faucet for expelling water is described herein. The spray head includes a spray head top portion having an inlet to receive water from the faucet and a spray head bottom portion having an outlet to expel water. The spray head further includes a pivoting joint mechanism structured to pivot the spray head relative to the faucet about a pivot axis.

20 Claims, 36 Drawing Sheets

(56) References Cited

U.S. PATENT DOCUMENTS

| | | | |
|---|---|---|---|
| 8,430,344 | B2 | 4/2013 | Cai et al. |
| 8,448,667 | B2 | 5/2013 | Meehan et al. |
| 8,733,674 | B2 | 5/2014 | Kajuch |
| 8,746,596 | B2 | 6/2014 | Grether et al. |
| 8,800,075 | B2 | 8/2014 | van Leyen et al. |
| 8,875,738 | B2 | 11/2014 | Yang et al. |
| 9,127,794 | B2 | 9/2015 | Leber |
| 9,162,237 | B2 | 10/2015 | Huffington et al. |
| 9,243,732 | B2 | 1/2016 | Grether et al. |
| 9,310,004 | B2 | 4/2016 | Grether et al. |
| 10,159,323 | B1 | 12/2018 | Dinkins |
| 10,322,423 | B2 | 6/2019 | Walker et al. |
| 10,619,773 | B2 | 4/2020 | Zhou et al. |
| 11,053,670 | B2 | 7/2021 | Tracy et al. |
| 11,193,258 | B2 | 12/2021 | Harrison et al. |
| 11,905,691 | B2 | 2/2024 | Heuer |
| 12,297,630 | B2 | 5/2025 | Heuer |
| 2004/0124267 | A1 | 7/2004 | Ouyoung |
| 2005/0156062 | A1 | 7/2005 | Thomas et al. |
| 2009/0039176 | A1 | 2/2009 | Davidson et al. |
| 2010/0043135 | A1 | 2/2010 | Patterson et al. |
| 2015/0354186 | A1 | 12/2015 | Tseng et al. |
| 2017/0101325 | A1 | 4/2017 | Ye |
| 2018/0306430 | A1 | 10/2018 | Weaver et al. |
| 2021/0071789 | A1 | 3/2021 | Oechsle et al. |

FOREIGN PATENT DOCUMENTS

| | | | |
|---|---|---|---|
| CN | 205534747 | U | 8/2016 |
| CN | 107626461 | A | 1/2018 |
| CN | 207576691 | U | 7/2018 |
| CN | 208627578 | U | 3/2019 |
| CN | 209511216 | U | 10/2019 |
| CN | 210424039 | U | 4/2020 |
| CN | 111593791 | | 8/2020 |
| CN | 211875368 | U | 11/2020 |
| CN | 212596497 | U | 2/2021 |
| CN | 212900260 | U | 4/2021 |
| CN | 212986135 | | 4/2021 |
| CN | 213296526 | U | 5/2021 |
| CN | 213452038 | U | 6/2021 |
| CN | 113136926 | | 7/2021 |
| CN | 214599830 | U | 11/2021 |
| EP | 3211282 | B1 | 8/2018 |
| EP | 3835640 | | 6/2021 |
| JP | 2010-275716 | A | 12/2010 |

PIVOTING SPRAY HEAD FAUCET

CROSS-REFERENCE TO RELATED APPLICATIONS

This application is a continuation of U.S. patent application Ser. No. 18/403,956, filed Jan. 4, 2024, now U.S. Pat. No. 12,297,630, which is a continuation of U.S. patent application Ser. No. 17/949,301, filed Sep. 21, 2022, now U.S. Pat. No. 11,905,691, which claims the benefit of U.S. Provisional Patent Application No. 63/246,327, filed Sep. 21, 2021, the entire disclosures of which are incorporated herein by reference in their entireties. To the extent appropriate, a claim of priority is made to each of the above disclosed applications.

TECHNICAL FIELD

This invention relates to the field of faucet spray heads. More particularly, this invention relates to a pivoting spray head for a faucet, the spray head including a pivoting joint mechanism for controlling the position of the spray head relative to the faucet spout and body.

BACKGROUND

Faucets have varying designs and configurations. Some faucets are equipped with a spray head that is intended to change the water output pattern. Some spray heads may also include a selector to dispense water as either an aerated stream or a spray. Various water output patterns may be useful for various types of tasks. For example, an aerated stream may be useful when a straight, evenly pressured water stream is desired and a soft stream may be useful for delicate tasks, such as rinsing fruits and vegetables, cleaning raw fish, or hand washing a delicate clothing item. Further, some spray heads, such as on a kitchen faucet, may be configured as a pull-out or pull-down spray head that a user can pull from a base and extend for more efficient cleaning or rinsing. A user may pull out or down on the spray head to reach certain areas of a sink and/or reach a large pot in a crowded sink. When doing so, a user must continue to hold the spray head when not docked in the faucet; otherwise, the spray head will return to the faucet in a normal downward and docked position.

SUMMARY

The present disclosure relates generally to an improved spray head. The spray head is coupled to a faucet and is pivotable by a user about a pivot axis. The spray head includes an inlet to receive water from the faucet and an outlet to expel water. The spray head is pivotable relative to the faucet body by a user to varying pivoted and unpivoted positions.

In a first aspect, a pivotable spray head for connection to a faucet for expelling water is described herein. The spray head includes a spray head top portion having an inlet to receive water from the faucet and a spray head bottom portion having an outlet to expel water. The spray head further includes a pivoting joint mechanism structured to pivot the spray head relative to the faucet about a pivot axis.

In a second aspect, a faucet is described herein. The faucet includes a faucet spout having a first end and a second end, a faucet base coupled to the first end of the faucet spout, and a spray head. The spray head is coupled to the second end of the faucet spout and structured to expel water from the faucet. The spray head is movable between an unpivoted position and a pivoted position.

In a third aspect, a spray head for connection to a faucet for expelling water is described herein. The spray head includes a spray head top portion having an inlet to receive water from the faucet and a spray head bottom portion having an outlet to expel water. The spray head includes a pivoting joint mechanism structured to pivot the spray head bottom portion relative to the spray head top portion about a pivot axis. The pivoting joint mechanism includes a detent structure to maintain the spray head in an unpivoted position.

In a fourth aspect, a spray head for connection to a faucet for expelling water is described herein. The spray head includes a spray head top portion having an inlet to receive water from the faucet and a spray head bottom portion having an outlet to expel water. The spray head includes a pivoting joint mechanism structured to allow the spray head bottom portion to pivot relative to the spray head top portion about a single degree of freedom.

In a fifth aspect, a spray head for connection to a faucet for expelling water is described herein. The spray head includes a spray head top portion having an inlet to receive water from the faucet and a spray head bottom portion having an outlet to expel water and a manifold. The spray head includes a pivoting joint mechanism structured to allow the spray head bottom portion to pivot relative to the spray head top portion about a single degree of freedom. The pivoting joint mechanism including a stationary member coupled to the spray head top portion and having a post defining a chamber therein. The pivoting joint mechanism also including a rotary member coupled to the manifold of the spray head bottom portion and having a groove, the groove receiving at least a portion of the post and the rotary member rotatable relative to the stationary member. The chamber is in fluid communication with the manifold.

In a sixth aspect, a spray head for connection to a faucet for expelling water is described herein. The spray head includes a spray head top portion having an inlet to receive water from the faucet and a spray head bottom portion having an outlet to expel water. The spray head includes a pivoting joint mechanism structured to allow the spray head bottom portion to pivot relative to the spray head top portion. The pivoting joint mechanism including a shroud spanning between the spray head top portion and the spray head bottom portion, a ball joint body having a substantially spherical outer surface, the spherical outer surface disposed within the shroud, and a collar configured to capture at least a portion of the spherical outer surface. The collar restricts rotation of the spray head bottom portion relative to the spray head top portion around a longitudinal axis while allowing pivoting movement between the spray head bottom portion and the spray head top portion.

In a seventh aspect, a spray head for connection to a faucet for expelling water is described herein. The spray head includes a spray head top portion having an inlet to receive water from the faucet and a spray head bottom portion having an outlet to expel water, the spray head bottom portion including a manifold. The spray head includes a pivoting joint mechanism structured to allow the spray head bottom portion to pivot relative to the spray head top portion. The pivoting joint mechanism including a shroud spanning between the spray head top portion and the spray head bottom portion, a ball joint body having a nut member and a ball member, the ball member forming a substantially spherical outer surface, the spherical outer surface disposed within the shroud; a top bushing; and a bottom seal. The spherical outer surface is captured between the top bushing and the bottom seal allowing the spray head bottom portion to pivot relative to the spray head portion, the top bushing sitting directly on the manifold.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The following drawings are illustrative of particular embodiments of the present disclosure, and therefore, do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
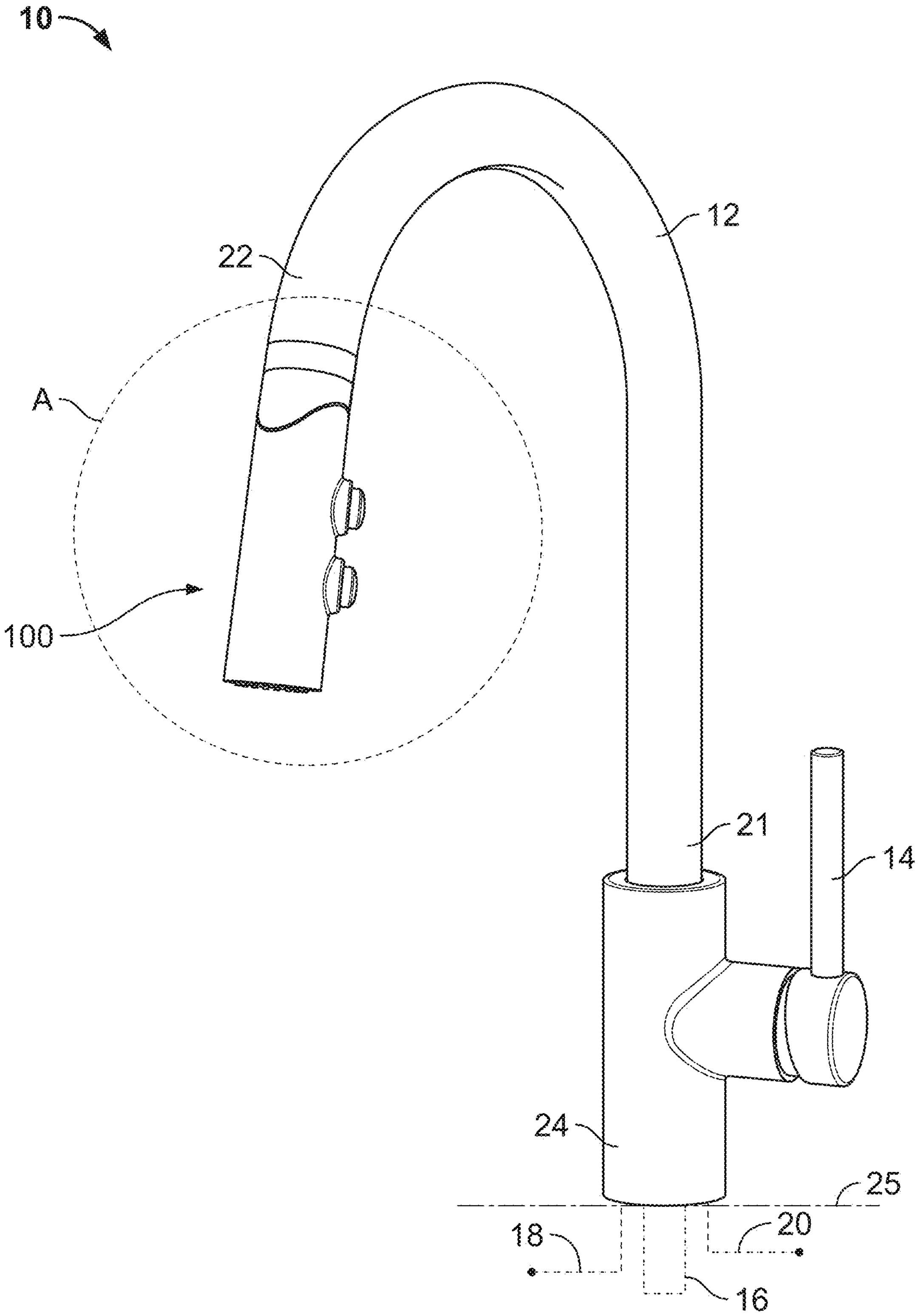
FIG. 1 illustrates a perspective view of a faucet with a spray head, according to an embodiment of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

As briefly described above, embodiments of the present disclosure are directed to a faucet spray head with pivoting capabilities. The spray head is coupled to the faucet and is pivotable by a user about a pivot axis. The spray head includes an inlet to receive water from the faucet and an outlet to expel water. The spray head is pivotable by a user to varying pivoted and unpivoted positions. In some embodiments, the spray head may be selectively docked or undocked from the faucet body. In addition, in some embodiments, the spray head may include selections activatable by a user to pause and/or modulate the water flow through the spray head.

The spray head can pivot relative to the faucet body about a joint formed within the spray head. The spray head remains in the pivoted position until a user moves the spray head back to the normal downward position. The spray head also includes one or more actuator controls for pausing the water flow or for modulating a pattern of water between spray patterns. In some examples, the spray patterns may range from an aerated stream to a shower spray. According to an aspect, the spray head may be dynamically adjusted during use to select between (1) a pivoted position (e.g., pivoted away or toward the faucet body) or an unpivoted home position, and (2) a water output pattern that is suited for a given activity and that meets the needs of the user for the task at hand.

In many conventional faucets, in a docked position, the spray stream is limited to a single arc across the sink floor. By incorporating a pivot function into the spray head of the faucet, the stream of water expelled from the faucet can hit every part of a sink quickly (e.g., in under five seconds) without the user needing to undock the spray head (e.g., while the spray head is mounted or coupled to the faucet body). In situations where a sink may be crowded with dishes, such as large pots and pans, a user may wish to leave the spray head docked for case of washing, while still positioning the stream from the spray head to an angle/position that suits the task at hand. Additionally, in some of the depicted embodiments, the pivoting joint mechanism described herein does not require the use of a ball joint valve, thereby reducing the bulkiness of the faucet and allowing for a slimmer faucet aesthetic. In other embodiments, a ball joint valve may be used as required or desired.

FIG. 1 shows a representative faucet 10 including a faucet body 12 and a faucet spray head 100 that may be articulated relative to the faucet body 12. As discussed further herein, the spray head 100 is pivotable about a joint formed within the spray head 100. In the example depicted, the spray head 100 is pivotable about a single degree of freedom (e.g., in two directions within a single plane). In other embodiments, the spray head 100 may be pivotable about multiple degrees of freedom (e.g., in several directions in multiple planes). In some embodiments, the spray head 100 is pivotable about 360 degrees (e.g., can rotate about the spout freely in a full circle). The faucet spray head 100 may also be detached or detachable from the faucet body 12. In the example shown, the faucet 10 includes a base 24 and the faucet body 12. In the embodiment shown, the faucet 10 is mounted to a sink deck 25 at the base 24. The faucet body 12 is connected at a first end 21 to the base 24 and at a second end 22 to the faucet spray head 100.

The faucet 10 includes the faucet spray head 100 positioned proximate the second end 22 of the faucet body 12. As shown, the faucet spray head 100 is in a retracted position, where the faucet spray head 100 is docked at the second end 22 of the faucet body 12. In various examples, an inlet 111 (shown in FIGS. 6-9) of the spray head 100 is configured for connection to a faucet hose 16 that may be at least partially positioned within the faucet body 12. In some examples, the faucet body 12 is rigid. In other examples, at least a portion of the faucet body 12 may be flexible. Hot and cold water conduits 18, 20, respectively, such as for example, copper pipes or plastic tubing, connect the faucet 10 to a water source (not shown). The faucet hose 16 can be any of a variety of different types including, but not limited to, a nylon-braided hose, a metal braided hose, a flexible hose, a coated hose, etc.

Referring to FIGS. 1-5, the faucet 10 is configured to dispense water from a water source out of an outlet 112 of the spray head 100. Further, the faucet 10 may be configured to be controlled (i.e., on/off, water volume, and water temperature) via traditional methods (e.g., a faucet handle 14), and/or via gesture or voice input. Although the faucet 10 may be illustrated and discussed herein as a kitchen faucet, aspects of the spray head 100 described herein may be implemented in other types of faucets, including but not limited to, bath faucets, shower faucets, bidet faucets, etc. An outer profile of the spray head 100 may have a variety of different shapes and sizes, which may provide a variety of different aesthetic configurations of the faucet 10.

According to an aspect, the spray head 100 includes a pause selection 108 and a spray selection 110 positioned thereon to allow the user to toggle characteristics of the water expelled at the spray head outlet 112. In some examples, operation of the pause selection 108 and/or spray selection 110 controls the flow pathway of the water through the spray head 100, thereby modifying characteristics of the water expelled at the spray head outlet 112, such as the water output pattern. For example, operation of the pause selection 108 allows the user to stop the flow of water to the spray head outlet 112 while depressed. As a further example, operation of the spray selection 110 allows the user to operate the spray head in a spray mode. The spray mode produces a shower-like spray pattern of water.

When neither the pause selection 108 nor the spray selection 110 is selected, the spray head 100 is in an aerated stream mode. In the aerated stream mode, the spray head 100 produces an aerated stream pattern of water expelled from the spray head outlet 112. An aerated stream may include a flow of water that has been broken up into a plurality of smaller streams of water. In some examples, an aerated stream may include a mixture of water and air. For example, a user may want to dispense an aerated stream of water to produce less splash than a spray pattern of water for a given task. In various embodiments, other types of spray patterns and pattern selections may be implemented with the spray head 100.

Figure 2:
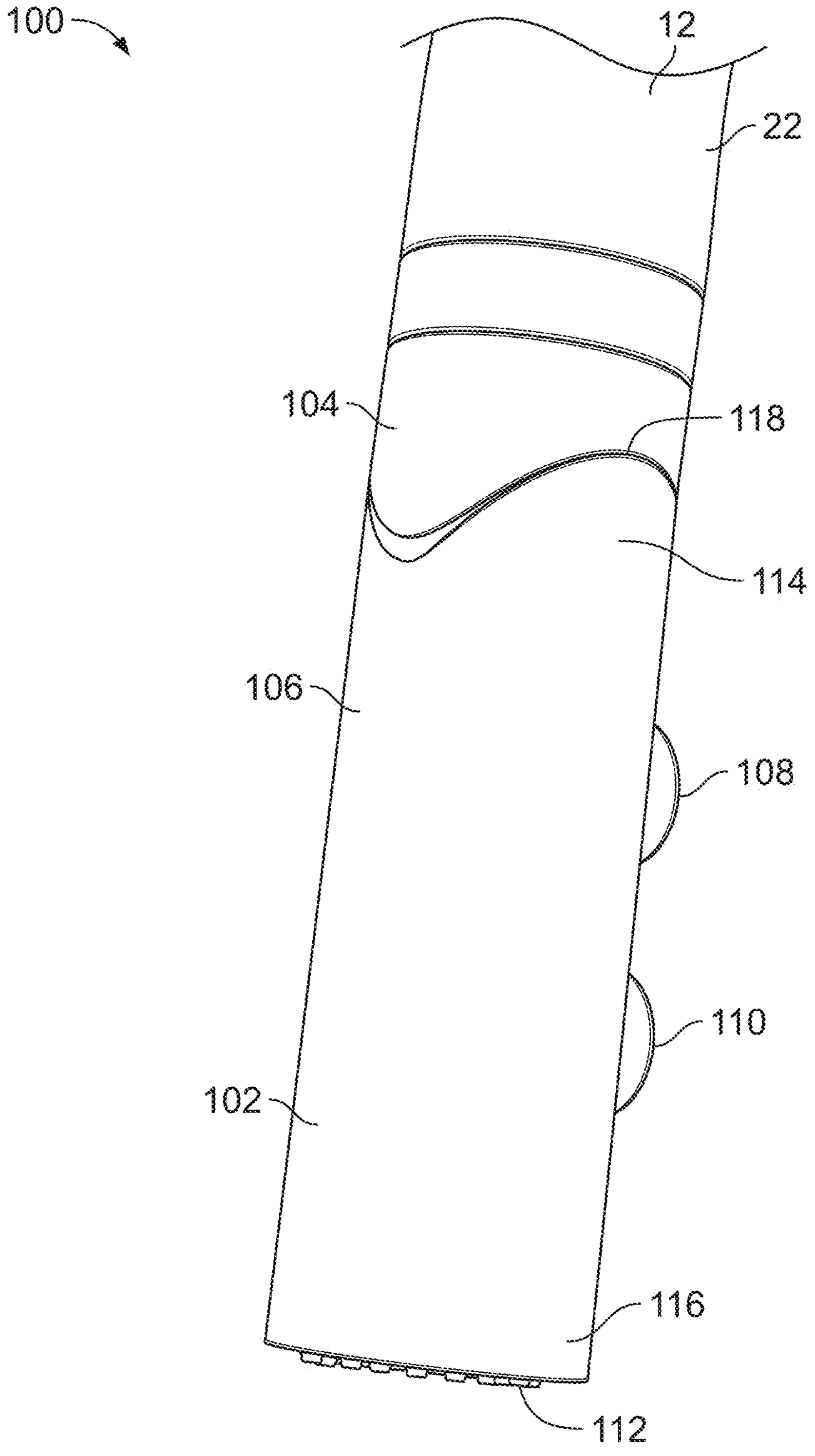
FIG. 2 illustrates a perspective view of a spray head in portion A of FIG. 1.

FIG. 2 is a perspective view of the spray head 100 according to one example embodiment of the present disclosure. The spray head 100 generally includes a stylized spray head outer housing 102 with an inlet 111 (shown in FIG. 6) positioned proximate an inlet end 114, an outlet 112 positioned proximate an outlet end 116, and an intermediate section positioned between the inlet 111 and the outlet 112 and configured to house interior parts of the spray head 100, which are in fluid communication with the inlet 111 and outlet 112. In various examples, the inlet 111 of the spray head 100 is configured for screw-connection to the faucet hose 16.

Figure 3:
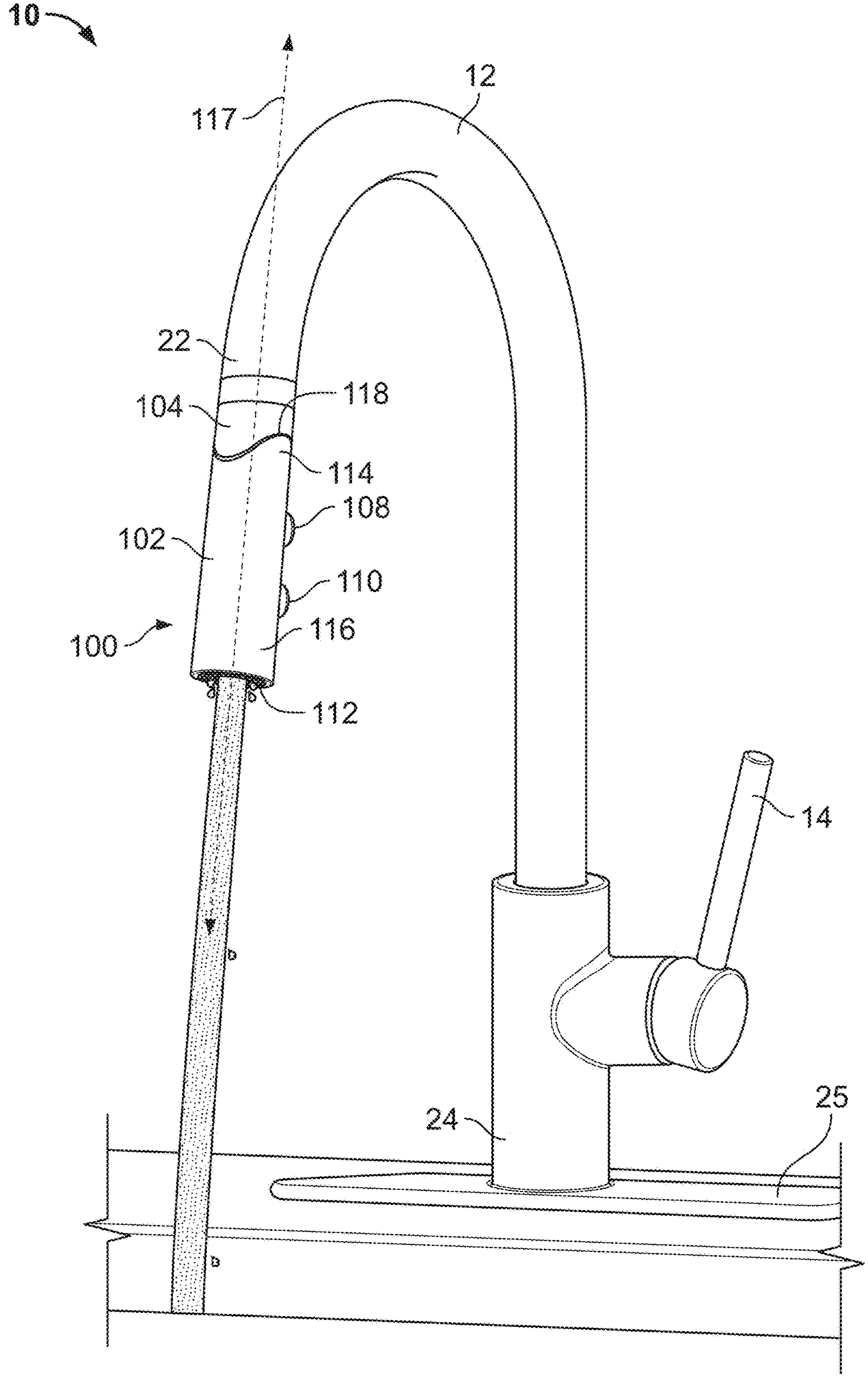
FIG. 3 illustrates a perspective view of the faucet of FIG. 1 in a docked and home position.
Figure 4:
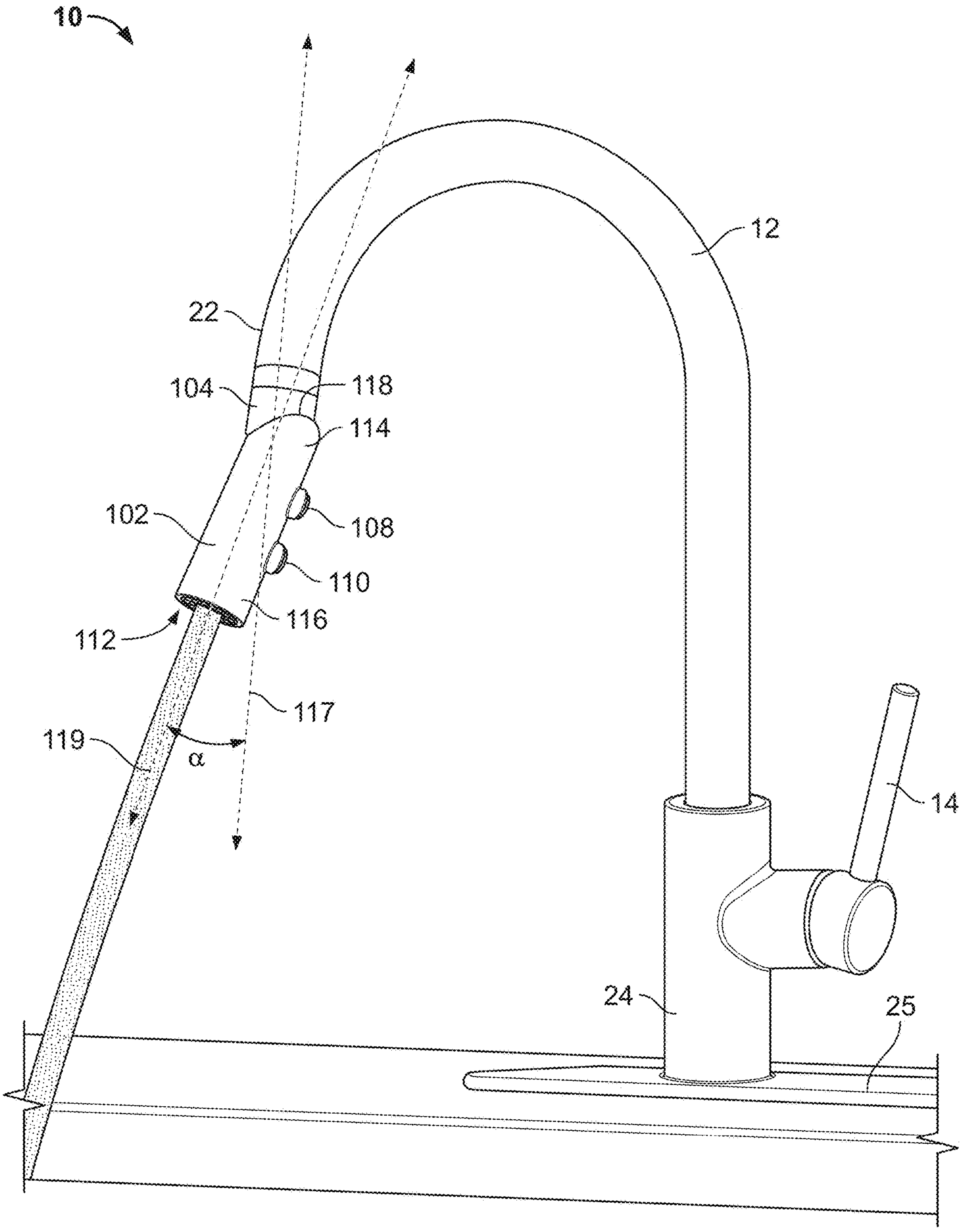
FIG. 4 illustrates a perspective view of the faucet of FIG. 1 in a docked and first pivoted position.
Figure 5:
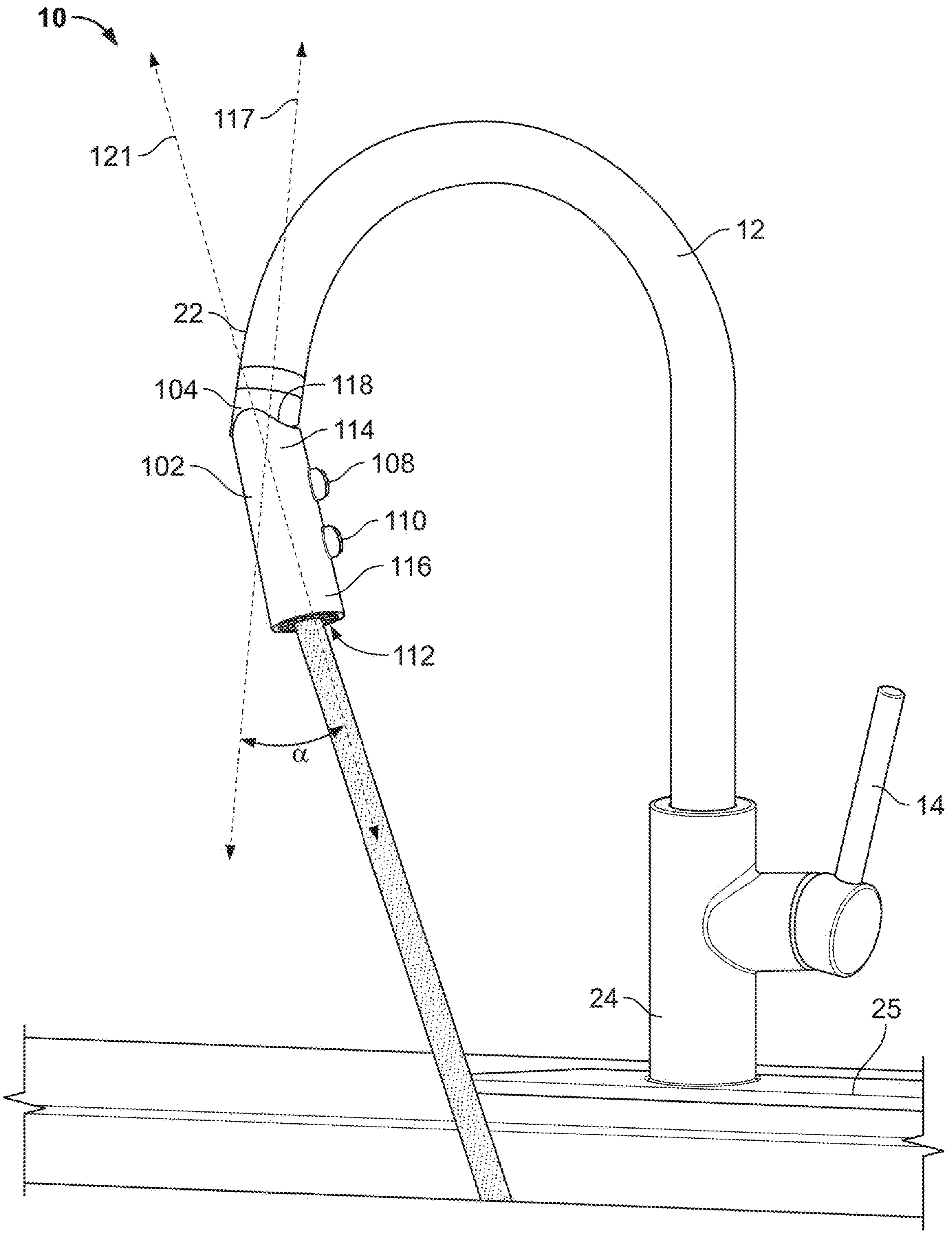
FIG. 5 illustrates a perspective view of the faucet of FIG. 1 in a docked and second pivoted position.
Figure 7:
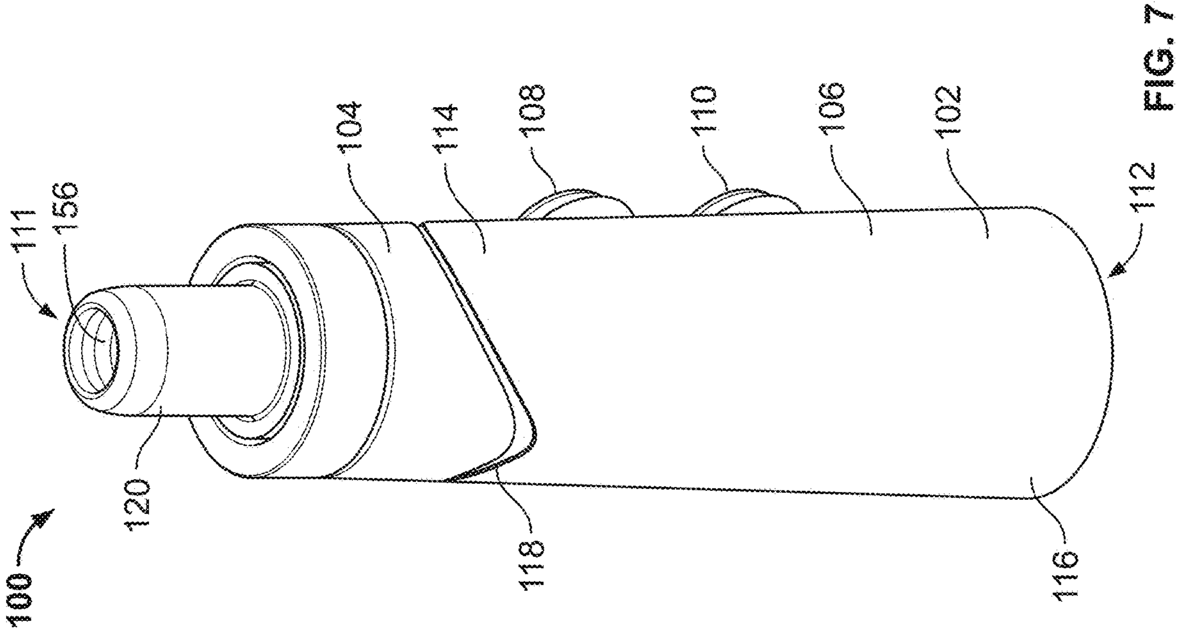
FIG. 7 illustrates a rear perspective view of the spray head of FIG. 2.
Figure 6:
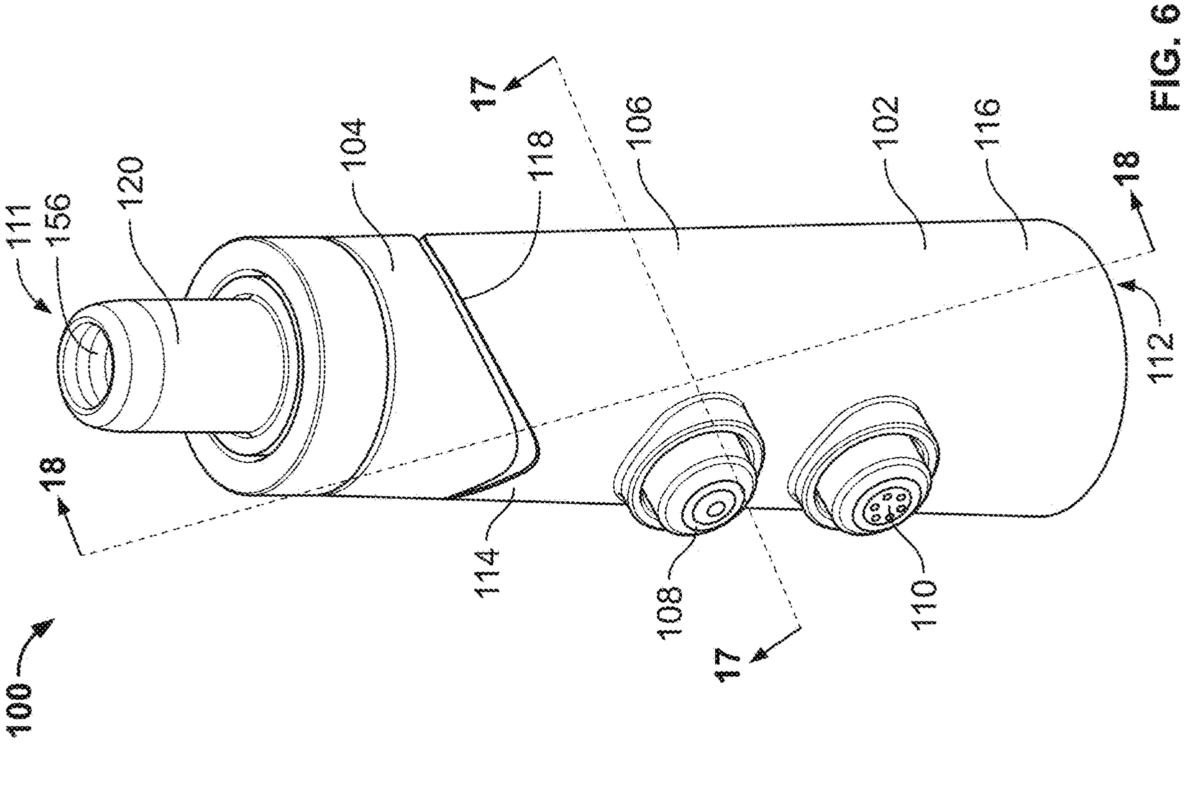
FIG. 6 illustrates a front perspective view of the spray head of FIG. 2.
Figure 9:
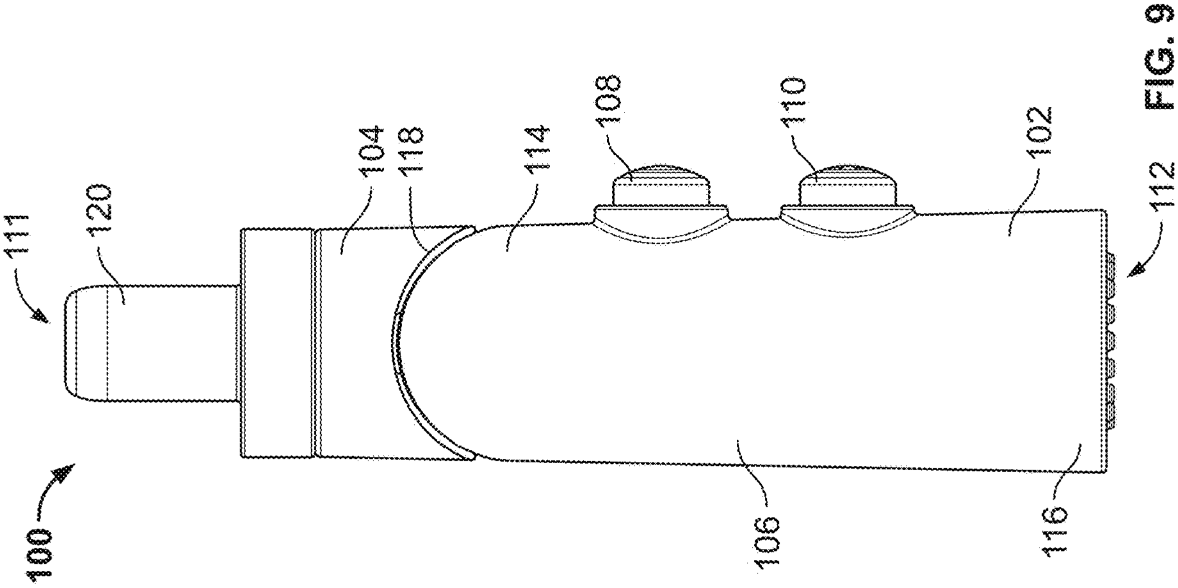
FIG. 9 illustrates a side view of the spray head of FIG. 2.
Figure 8:
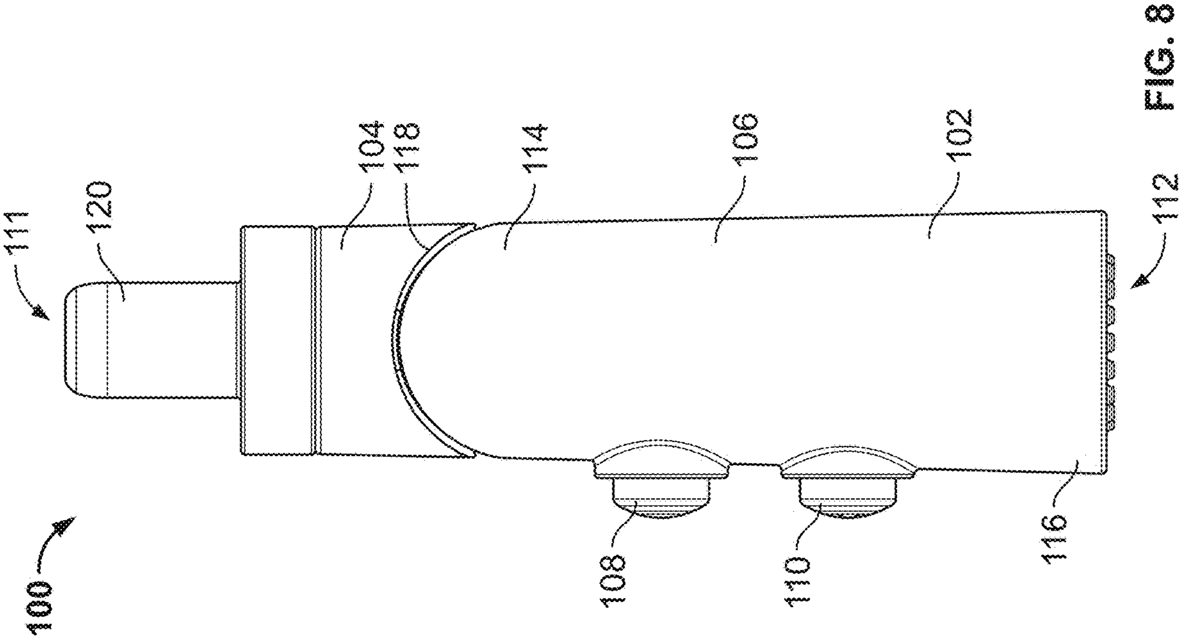
FIG. 8 illustrates a side view of the spray head of FIG. 2.
Figure 20:
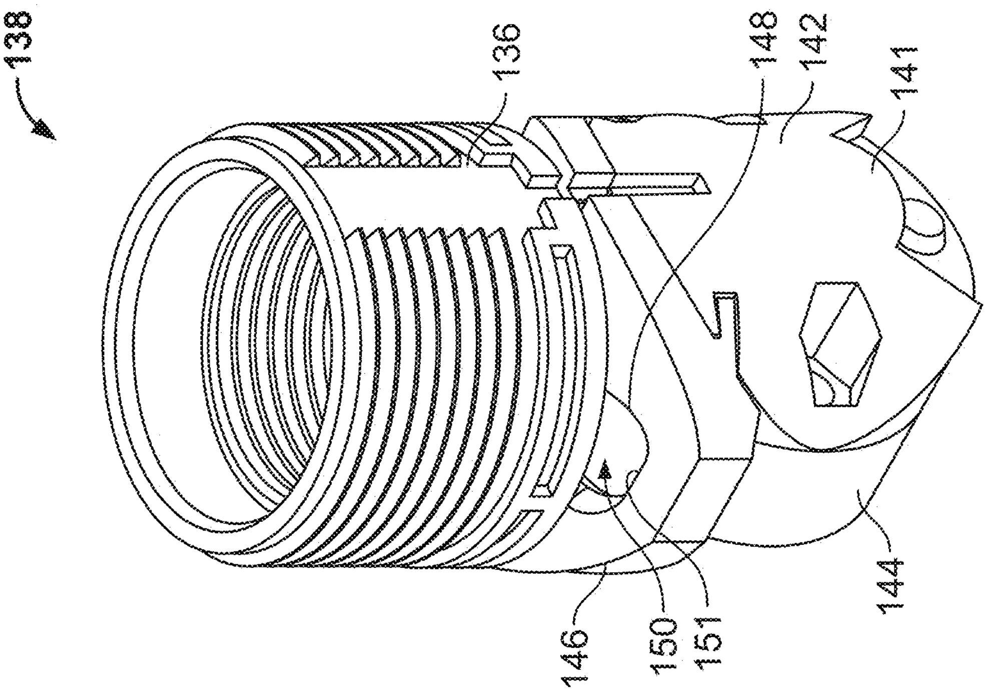
FIG. 20 illustrates a rear perspective view of the pivoting joint mechanism of FIG. 19.
Figure 19:
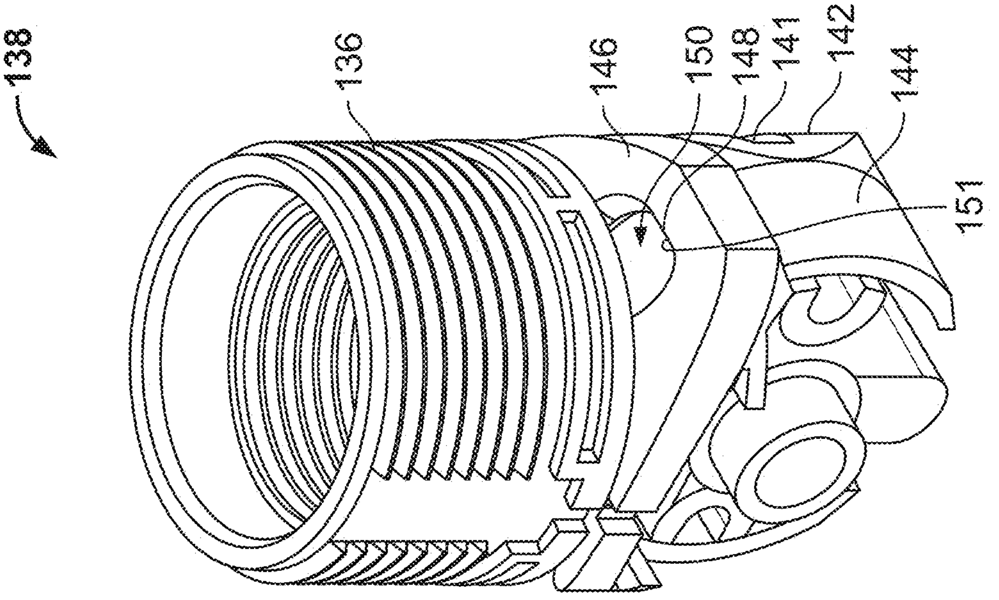
FIG. 19 illustrates a front perspective view of a pivoting joint mechanism of the spray head of FIG. 2.

Referring to FIGS. 3-5, the spray head 100 is pivotable about a joint (shown as pivoting joint mechanism 138 in FIGS. 19-20) thereby directing the water flow from the spray head 100 in different directions. In the illustrated embodiment and as will be discussed further herein, the spray head 100 is pivotable about a single degree of freedom. As shown in FIG. 3, the spray head 100 is positioned in a home (e.g., unpivoted) position along an unpivoted longitudinal axis 117. As shown in FIG. 4, the spray head 100 is positioned in a first pivoted position along a first pivoted longitudinal axis 119 (e.g., away from the faucet body 12). As shown in FIG. 5, the spray head 100 is positioned in a second pivoted position along a second pivoted longitudinal axis 121 (e.g., back toward the faucet body 12). The spray head 100 can be pivoted to any position between the first pivoted position and the second pivoted position. In various embodiments, the spray head 100 is retained in the position the user desires. For example, the user can pivot the spray head 100 into a pivoted position (e.g., first pivoted position, second pivoted position, or any position between) and the spray head 100 remains in the pivoted position until the user moves the spray head 100 to another position. In some embodiments, the spray head 100 is biased into the home position (e.g., unpivoted position) by a torsion spring (or other type of biasing member). In this way, when the user pivots the spray head 100 and releases, the biasing member forces (under biasing/spring load) the spray head 100 back into the home, unpivoted position.

In the illustrated example in FIGS. 4-5, the spray head 100 pivots up to an angular displacement a in two directions relative to the faucet body 12 (e.g., away from the faucet body 12 and toward the faucet body 12). To achieve the first pivoted position from the unpivoted position, the spray head 100 is pivoted from the unpivoted longitudinal axis 117 to the first pivoted longitudinal axis 119 by an angle equal to $\alpha$. To achieve the second pivoted position from the unpivoted position, the spray head 100 is pivoted from the unpivoted longitudinal axis 117 to the second pivoted longitudinal axis 121 by an angle equal to $\alpha$. To achieve the second pivoted position from the first pivoted position, the spray head 100 is pivoted from the first pivoted longitudinal axis 119 to the second pivoted longitudinal axis 121 by an angle equal to $2\alpha$. In various embodiments, the spray head 100 can also be pivoted from the second pivoted position (e.g., along second pivoted longitudinal axis 121) to the first pivoted position (e.g., along first pivoted longitudinal axis 119). Accordingly, the total angular pivot range is equal to $\alpha$ multiplied by two. In various embodiments, the angular displacement a can range from 0 degrees to 30 degrees. Accordingly, in these embodiments, the total angular displacement (e.g., $2\alpha$) of the pivoting spray head can range from 0 degrees to 60 degrees. In other embodiments, the angular displacement a can range from 0 degree to 45 degrees. Accordingly, in these embodiments, the total angular displacement (e.g., $2\alpha$) of the pivoting spray head can range from 0 to 90 degrees. In other embodiments, the angular displacement a can range from 0 degree to 60 degrees. Accordingly, in these embodiments, the total angular displacement (e.g., $2\alpha$) of the pivoting spray head can range from 0 to 120 degrees. In other embodiments, the angular displacement a can be more or less than 0 to 60 degrees. In some examples, a total angular displacement may be implemented to complement an intended or anticipated height of the spray head 100 over a sink basin (e.g., based on a height of the faucet body 12). Accordingly, a water stream from the spray head may reach a substantial portion of an inner basin of a sink (e.g., a sink of average size for the selected application, such as a kitchen or bathroom sink), while avoiding pivotability to a position that would allow, when the spray head 100 is mounted to the faucet body, a water stream to be directed outside of the sink.

Referring to FIGS. 6-11, the spray head 100 is shown in various views. In the examples illustrated, the spray head 100 includes an inlet 120 defining an upper conduit 156, which may be a tubular member with an upper internally threaded barrel for attachment to the faucet hose 16. The inlet 120 attaches to the spray head outer housing 102 via an external threading. The spray head outer housing 102 may be a generally tubular component defining the inlet 111 and the outlet 112 of the spray head 100. In some examples, the spray head outer housing 102 may further define a first slot 128 through which the pause selection 108 may be exposed and a second slot 130 through which the spray selection 110 may be exposed. In some examples and as illustrated, both the pause selection 108 and the spray selection 110 are configured as buttons, and the first slot 128 and second slot 130 are axial slots for detent-seating and exposure of the buttons. According to an aspect, the pause selection 108 and spray selection 110 are in normally open positions (e.g., allowing water to flow through the diverter assemblies associated therewith).

Figure 11:
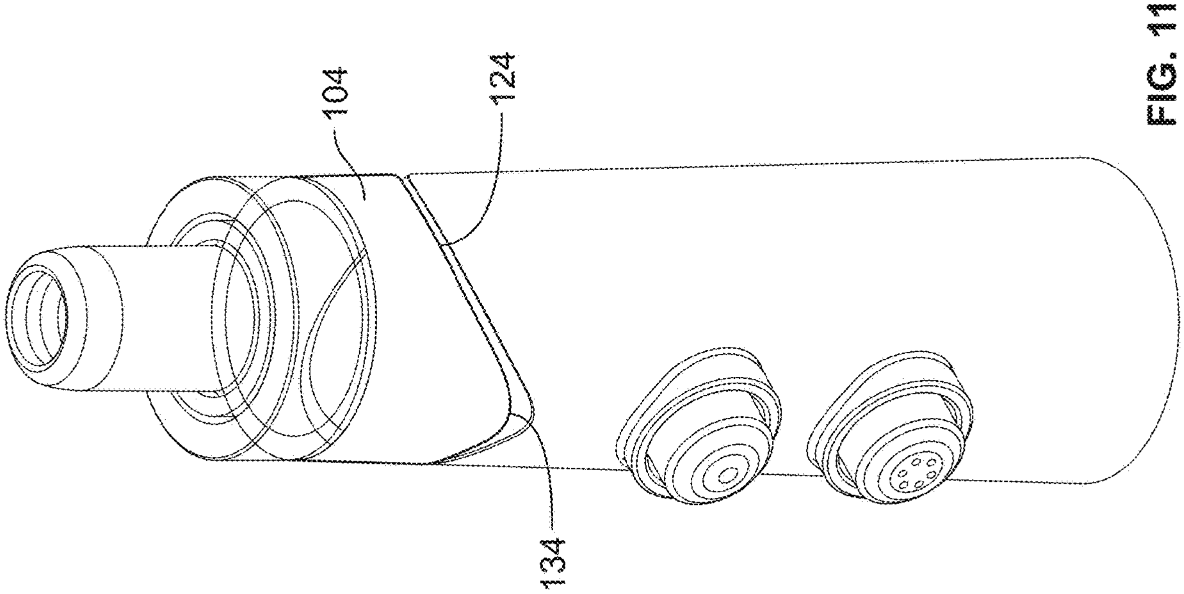
FIG. 11 illustrates a front perspective view of a top housing portion of the spray head of FIG. 2.
Figure 10:
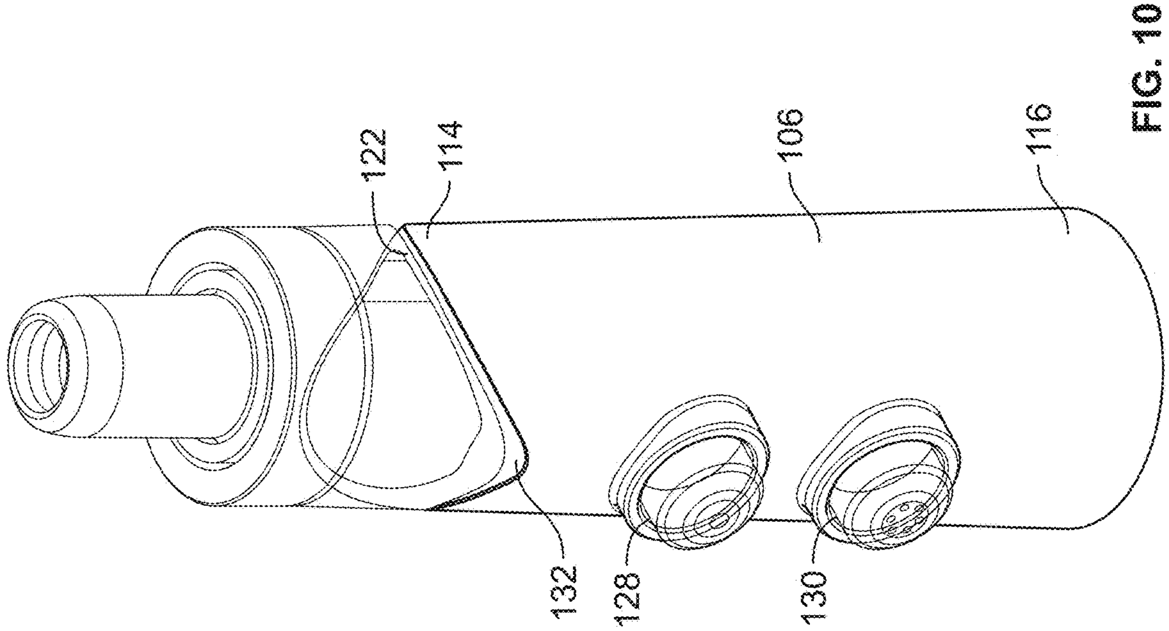
FIG. 10 illustrates a front perspective view of a bottom housing portion of the spray head of FIG. 2.
Figure 12:
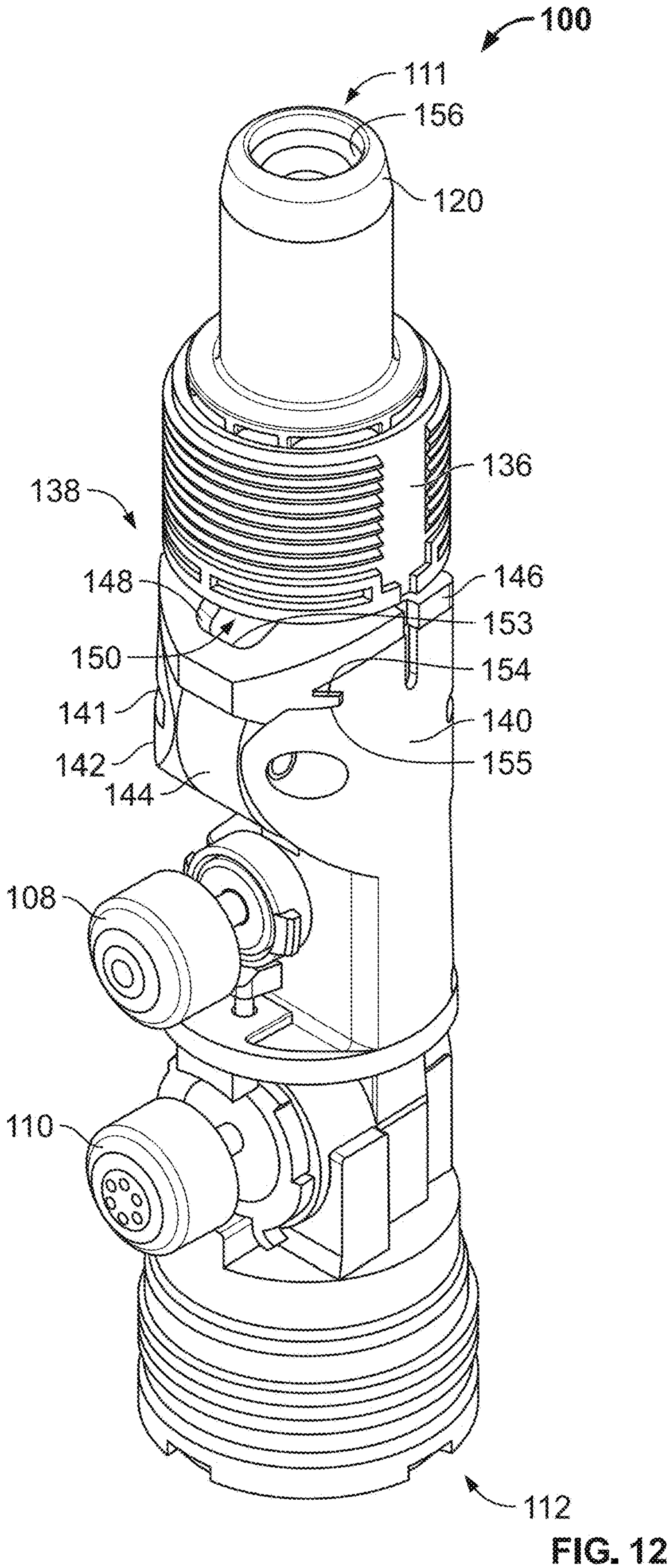
FIG. 12 illustrates a front perspective view of the spray head of FIG. 2 with the housing removed.
Figure 13:
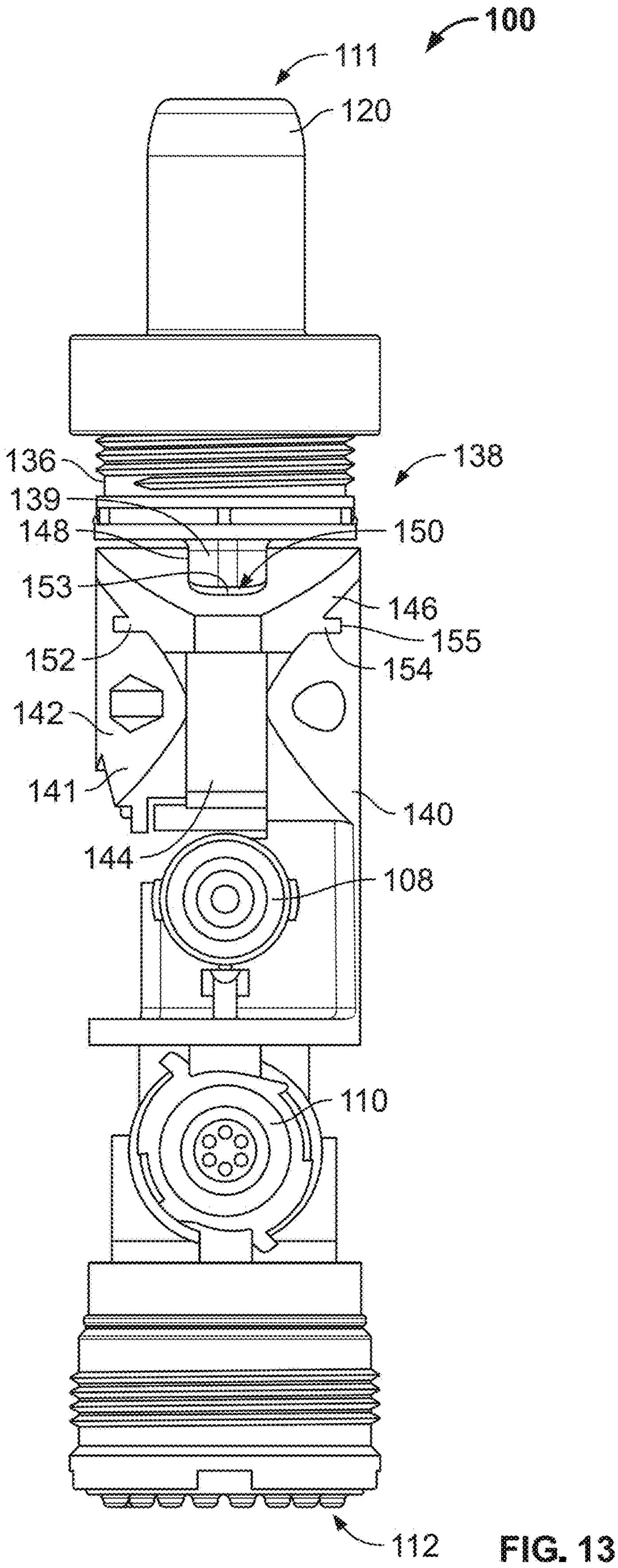
FIG. 13 illustrates a front view of the spray head of FIG. 2 with the housing removed.
Figure 14:
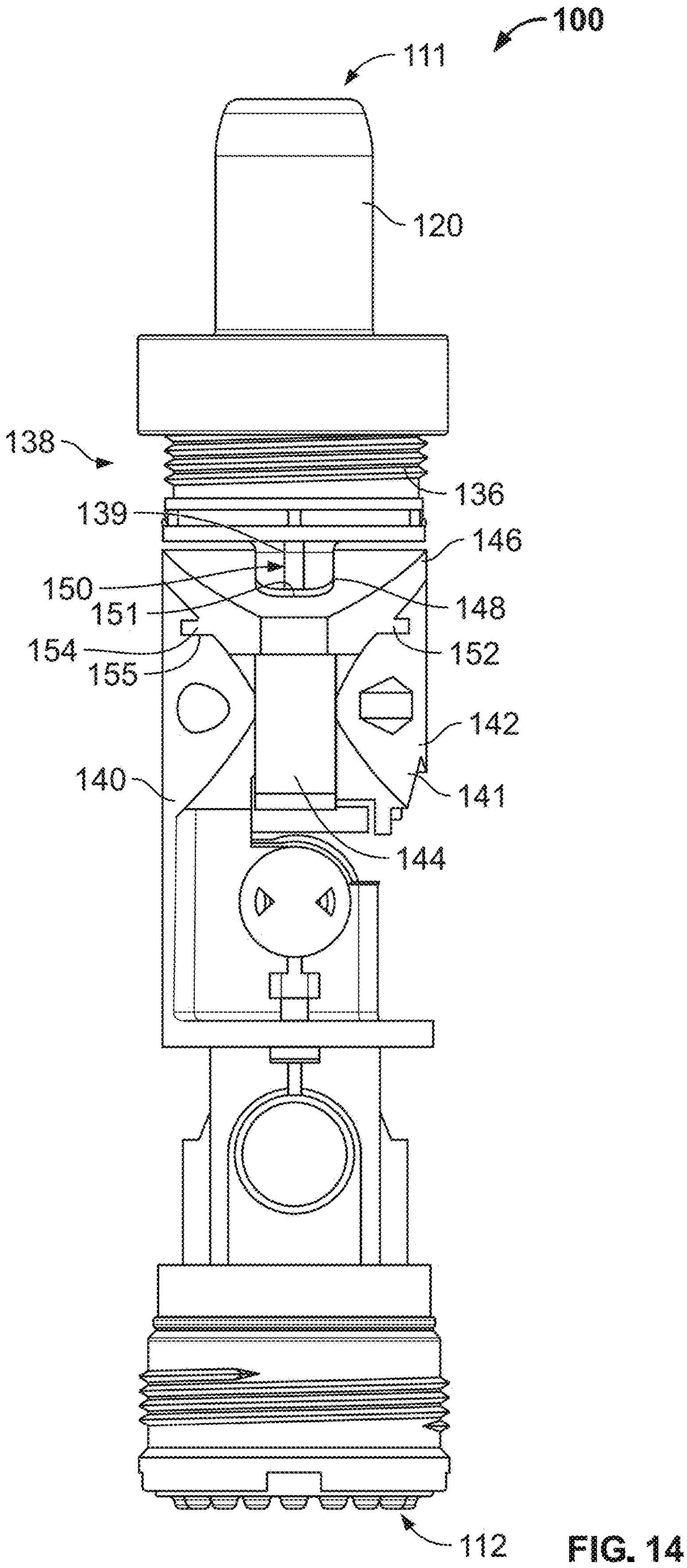
FIG. 14 illustrates a rear view of the spray head of FIG. 2 with the housing removed.
Figure 15:
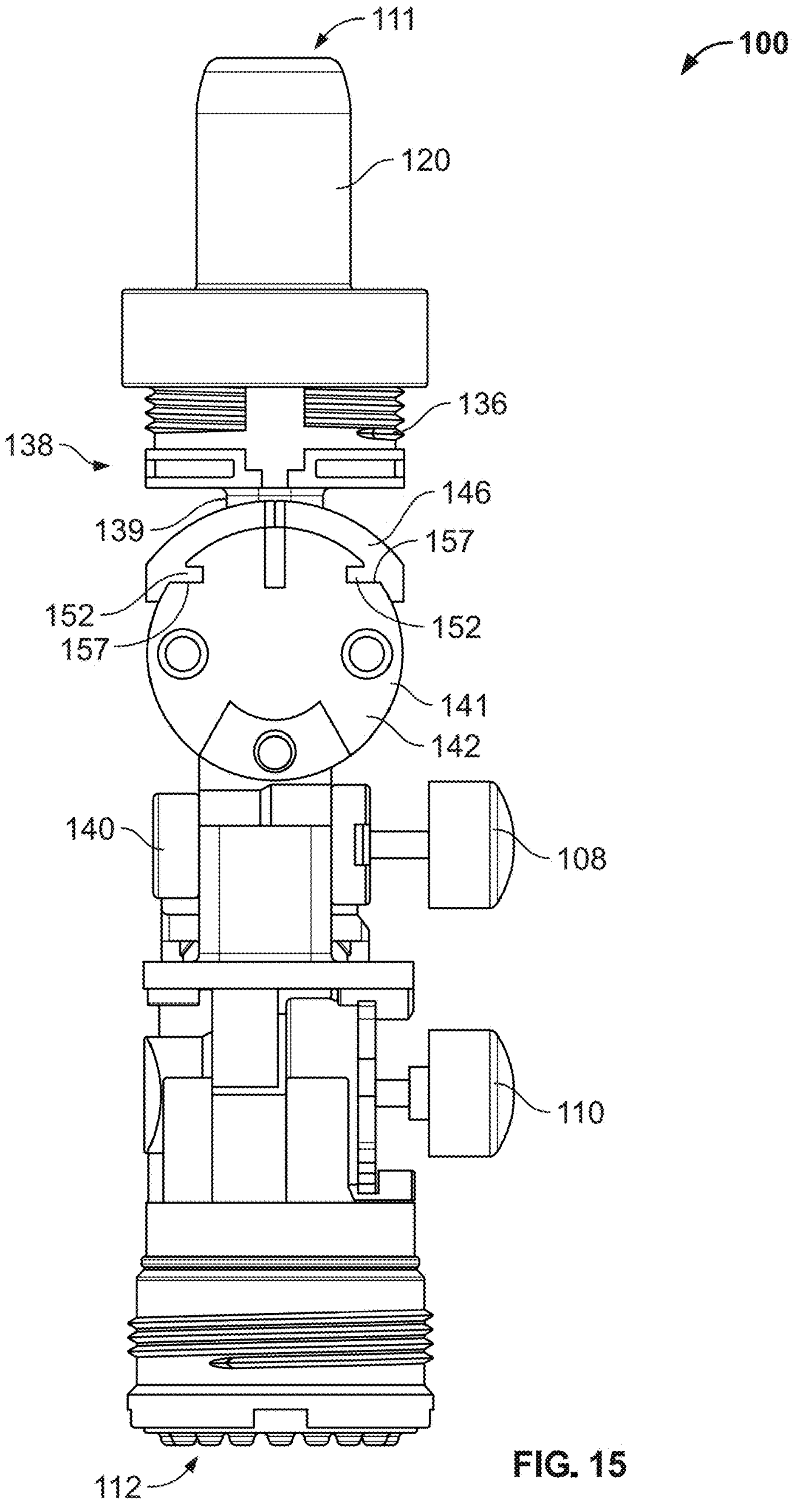
FIG. 15 illustrates a side view of the spray head of FIG. 2 with the housing removed.
Figure 16:
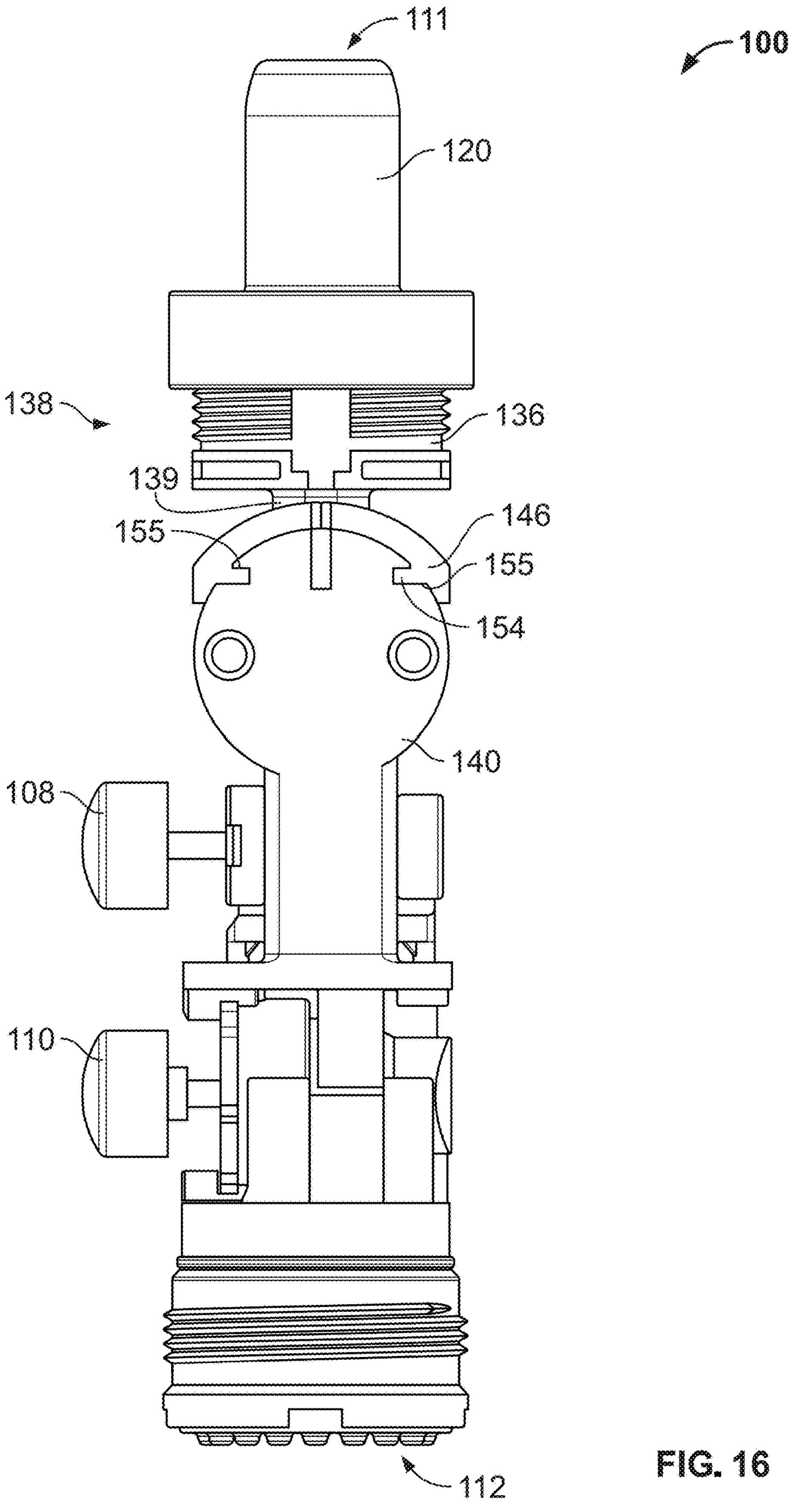
FIG. 16 illustrates a side view of the spray head of FIG. 2 with the housing removed.
Figure 17:
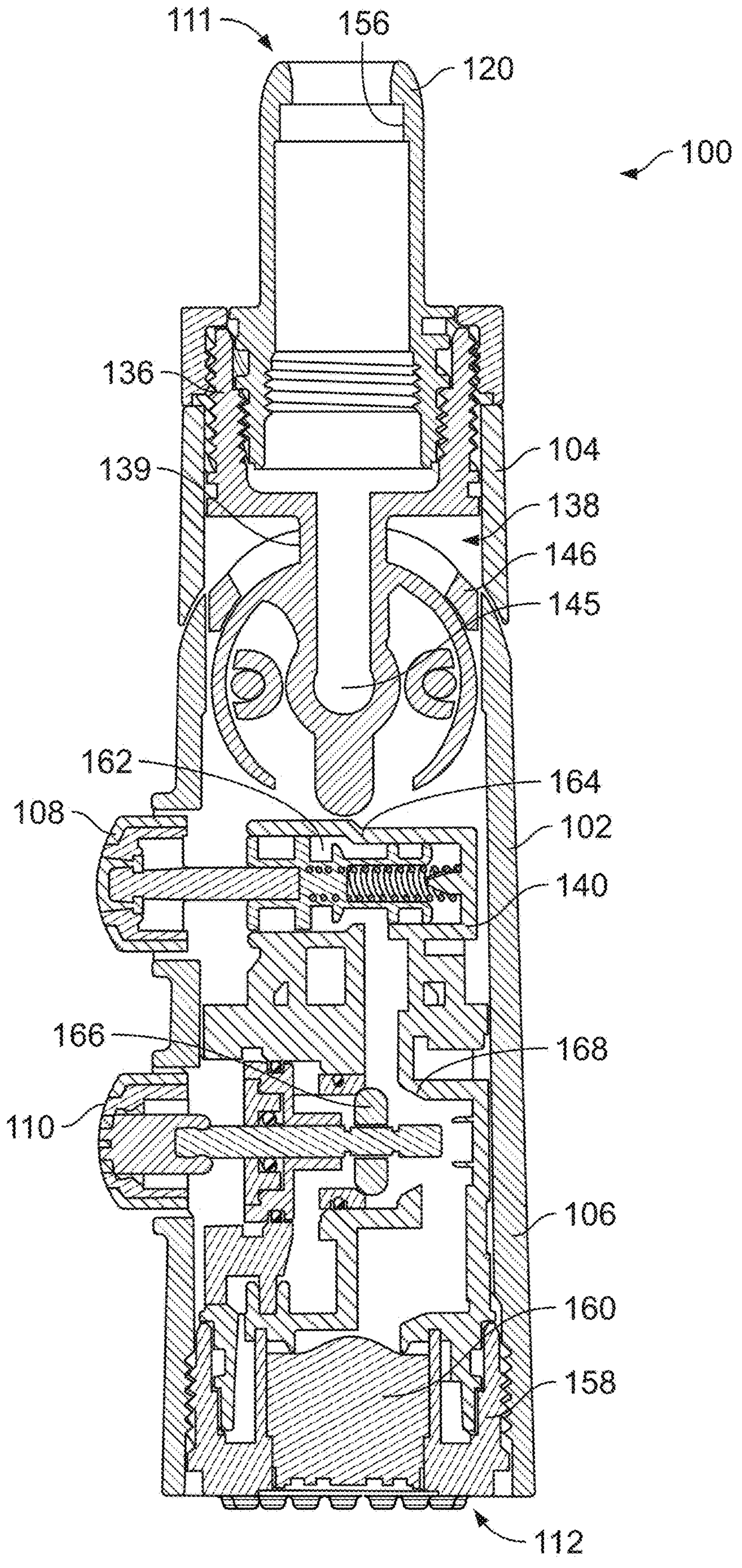
FIG. 17 illustrates a section view of the spray head of FIG. 6 along section line 17-17.

Still referring to FIGS. 6-11, the spray head outer housing 102 includes a top housing portion 104 and a bottom housing portion 106. Referring specifically to FIGS. 10-11, the top housing portion 104 includes a bottom edge 124 and the bottom housing portion 106 includes a top edge 122. The bottom edge 124 and top edge 122 are formed as substantially arcuate shapes that mate together at a scam 118. The seam 118 allows for the pivoting movement of the bottom housing portion 106 relative to the top housing portion 104. The bottom edge 124 of the top housing portion 104 extends to a lowest point 134 proximate where the top edge 122 of the bottom housing portion 106 extends to a lowest point 132. The shapes of each housing portion substantially track/follow each other to provide a uniform appearance of the spray head outer housing 102 across the seam 118. In other embodiments, the shape of the housing portions 104, 106 can be various other shapes. The bottom housing portion 106 pivots relative to the top housing portion 104 to achieve the varying pivot positions (e.g., as shown in FIGS. 4 and 5).

Referring generally to FIGS. 12-16, the spray head 100 is shown to include the pause selection 108, for pausing a stream of water from expelling through the outlet 112 and the spray selection 110, for selecting a spray mode. According to one example implementation, the pause selection 108 may normally be in an open position, which corresponds with allowing water to pass through the spray head 100. When the pause selection 108 is actuated or depressed by the user, the spray is paused. That is, the pause selection 108 may be configured to receive an actuation force from the user, which when received, may drive operation of the spray head 100 to stop water from flowing therethrough, and when released, may drive operation of the spray head 100 to allow water to flow therethrough. The illustrated embodiment of the pause selection 108 is shown implemented as a button positioned along a side of the spray head 100. Other configurations of the pause selection 108 (e.g., rotary, push/pull device, lever) are possible and are within the scope of the present disclosure.

According to an aspect, user actuation of the spray selection 110 may control how one or more flow paths within the spray head 100 are opened or closed, which cause the flow of water to be directed between the flow paths for providing an adjustable stream pattern (e.g., between an aerated stream and a shower spray). According to one example implementation, the spray selection 110 is normally in an open position, which corresponds to an aerated stream. When the spray selection 110 is actuated or depressed by the user, the water flow is diverted resulting in a spray pattern. When released, the water flow is diverted back, resulting in an aerated stream. The illustrated embodiment of the spray selection 110 is shown implemented as a button positioned along a side of the spray head 100, proximate the pause selection 108, and configured to receive an actuation force from the user. Other configurations of the spray selection 110 (e.g., rotary, push/pull device, lever) are possible and are within the scope of the present disclosure.

Still referring to FIGS. 12-16, the spray head 100 is shown in various views with the top housing portion 104 and the bottom housing portion 106 removed. As shown, the spray head 100 includes a pivoting joint mechanism 138 and a manifold 140. The pivoting joint mechanism 138 and manifold 140 form the internal structure of the spray head 100. The pivoting joint mechanism 138 includes projections 154 that mate with corresponding slots 155 on the manifold 140. In this way and as described further herein, the manifold 140 pivots with a rotary portion of the pivoting joint mechanism 138 when the spray head 100 is pivoted from a home position.

Referring to FIGS. 17-20, the pivoting joint mechanism 138 includes a stationary member 136 coupled to a rotary member 142. The stationary member 136 is coupled to the top housing portion 104 of the spray head 100 and the rotary member 142 is coupled to the bottom housing portion 106 of the spray head 100. The rotary member 142 rotates about an axis 145 (shown in FIG. 17) relative to the stationary member 136 when the spray head 100 is pivoted. In this way, when the spray head 100 is pivoted, the rotary member 142 rotates causing the bottom housing portion 106 to be rotated therewith and thus angularly displaces the bottom housing portion 106 from the top housing portion 104 (e.g., at an angular displacement a shown in FIGS. 4-5).

The rotary member 142 includes a side plate 141 and an arcuate top plate 146. The arcuate top plate 146 includes projections 152 that mate with corresponding slots 157 formed in the side plate 141 (shown in FIGS. 13-15). The arcuate top plate 146 includes a groove 150 formed therethrough. The groove 150 includes an internal wall 148 forming the side surfaces of the groove 150. The internal wall 148 includes two opposite end surfaces forming a first stop end 151 and a second stop end 153. The stationary member 136 includes a stationary coupling member 144 having a post 139 that extends through the groove 150 of the arcuate top plate 146 of the rotary member 142. The first stop end 151 and second stop end 153 define the limits of which the spray head 100 can pivot. Accordingly, as the rotary member 142 is displaced from a home position, the rotary member 142 rotates until the first stop end 151 or the second stop end 153 contacts the post 139 of the stationary member 136. In some embodiments, the arcuate top plate 146 is formed from two pieces coupled together at the groove 150.

Figure 18:
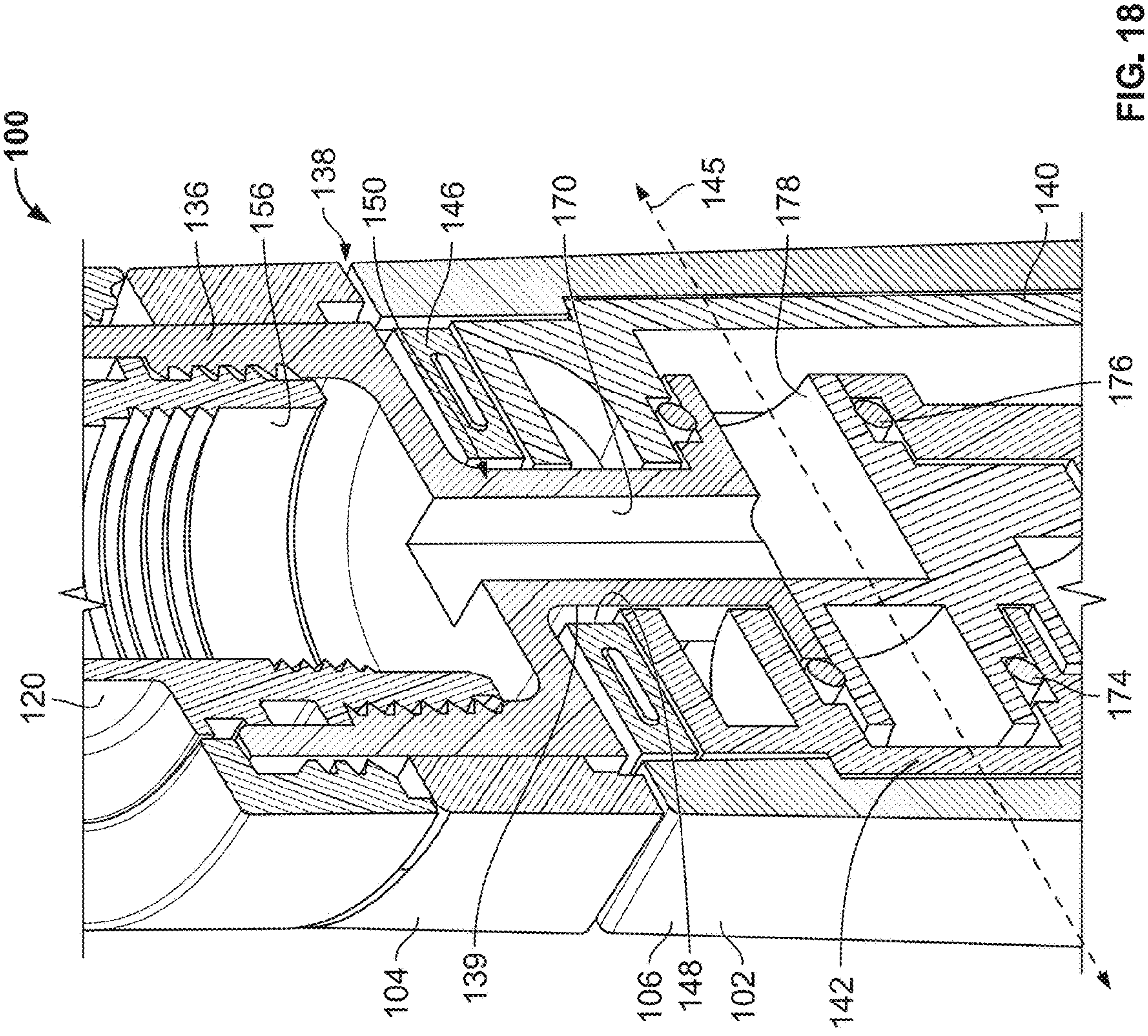
FIG. 18 illustrates a portion of the section view of the spray head of FIG. 6 along section line 18-18.

Referring to FIG. 18, a section view of a portion of the spray head 100 is shown. The pivoting joint mechanism 138 includes a first seal 174 positioned between the stationary member 136 and the rotary member 142. A second seal 176 is positioned between the stationary member 136 and the manifold 140. The first seal 174 and second seal 176 are structured to create friction between the stationary member 136 and the rotary member 142 and manifold 140, respectively. Accordingly, the first seal 174 and second seal 176 will create enough friction between the rotary and stationary surfaces of the spray head 100 to maintain the spray head 100 in the pivoted position the user desires. In other embodiments, other types of friction members can be used in place of the seals.

Figure 21:
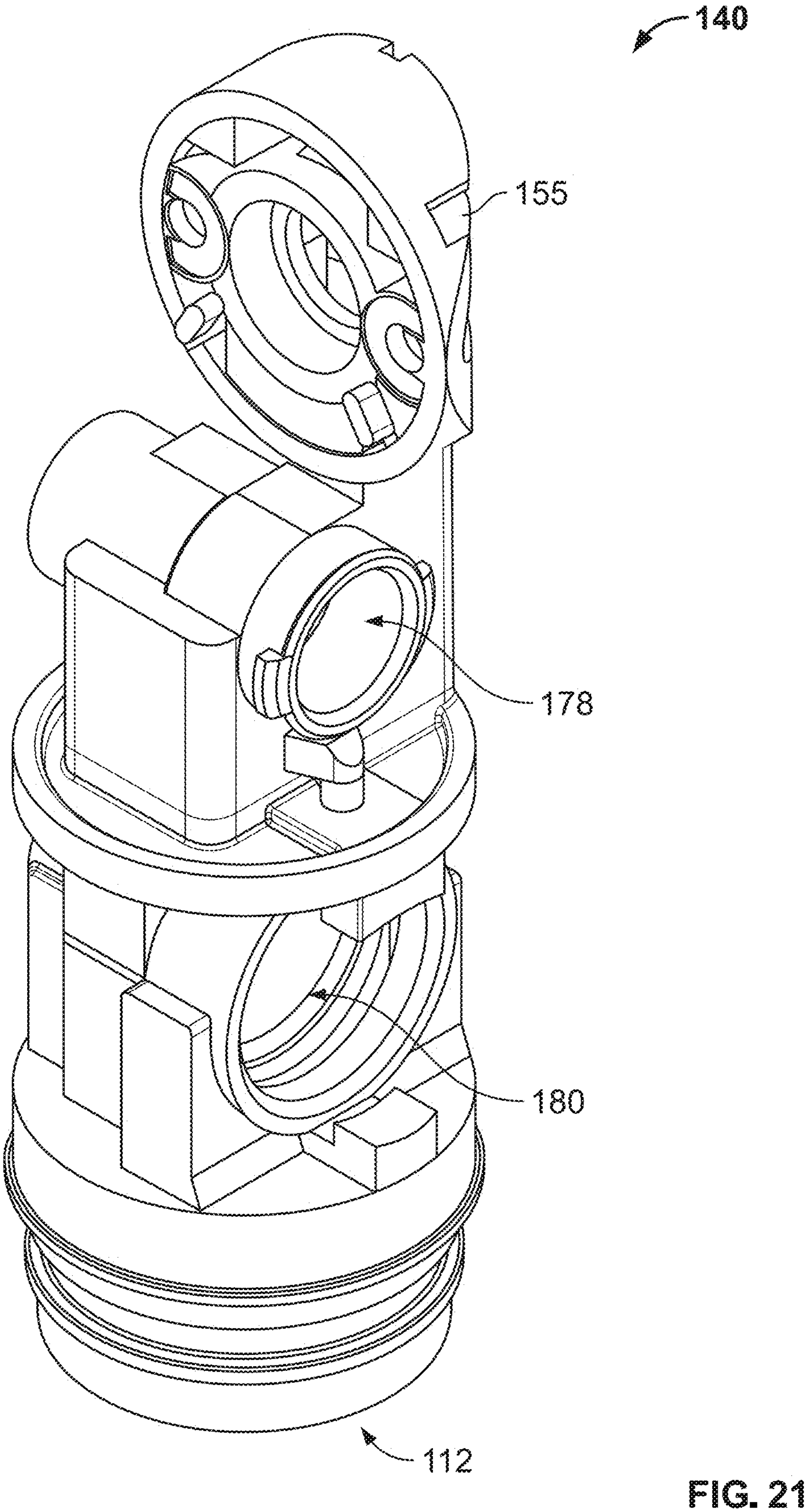
FIG. 21 illustrates a front perspective view of a manifold of the spray head of FIG. 2.

FIG. 21 illustrates a top perspective view of a manifold 140 for operation in the spray head 100. In some examples, the manifold 140 may be a complex and generally tubular member enclosed within the spray head outer housing 102 of the spray head 100. As described above, the manifold 140 includes one or more slots 155 that engage projections 154 on the pivoting joint mechanism 138. The manifold 140 includes a pause diverter chamber 178 and a spray diverter chamber 180.

Figure 22:
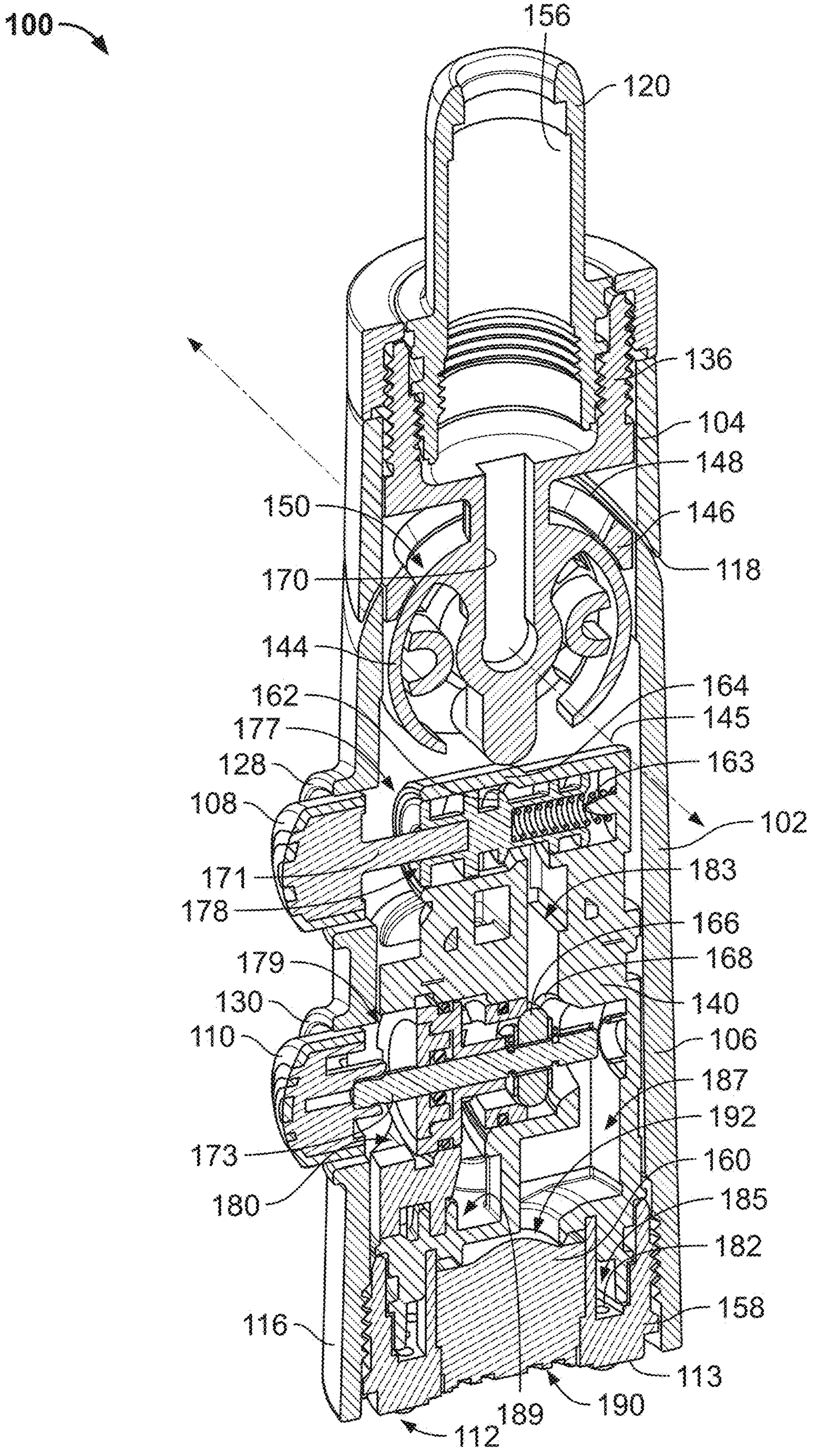
FIG. 22 illustrates a perspective section view of the spray head of FIG. 6 along section line 17-17.

FIG. 22 illustrates the manifold 140 assembled with the spray head 100. A pause diverter piston assembly 177 is positioned in the pause diverter chamber 178 and a spray diverter piston assembly 179 is positioned in the spray diverter chamber 180. The pause diverter piston assembly 177 is actuatable by the pause selection 108 and the spray diverter piston assembly is actuatable by the spray selection 110.

As shown, various ports are formed within the manifold 140 defining various possible water flow paths. A stream port 183 is formed between the pause diverter chamber 178 and the spray diverter chamber 180. An aerator stream port 187 is positioned between the spray diverter chamber 180 and an aerator 160. A nozzle stream port 189 is positioned between the spray diverter chamber 180 and a nozzle assembly 158 (e.g., nozzle chamber 185). As described further herein, a nozzle chamber 185 is positioned between an internal wall 184 and an outer wall 186 (both shown in FIGS. 22 and 24) of the nozzle assembly 158. All ports formed within the manifold 140 are fluidly coupled to each other. A user can select or unselect through which fluid paths/ports the water flows through the spray head 100 using the pause selection 108 and the spray selection 110.

Referring to FIG. 22, the pause diverter piston assembly 177 includes a piston 171 that is configured to be inserted into the pause diverter chamber 178. The piston 171 includes a valve plug 162 structured to selectively seal against a valve seat 164 formed in the manifold 140. The pause diverter piston assembly 177 may be controlled (e.g., the piston 171 is urged in and out of the pause diverter chamber 178) by operation of the pause selection 108. According to an aspect, a spring 163 may normally maintain the piston 171 in an open position, thereby allowing water to flow through the spray head 100. When the pause selection 108 is actuated or depressed by the user with a force greater than the resistance of the spring 163, the piston 171 moves toward a closed position.

When the pause selection 108 is actuated, the pause diverter piston assembly 177 moves into the closed position. In the closed position, the seal between the valve plug 162 and the valve seat 164 closes the stream port 183, thereby preventing water from flowing through the pause diverter chamber 178 and into the stream port 183. When the pause selection 108 is not actuated, the piston 171 remains in the open position, thereby allowing water to flow through the pause diverter chamber 178 and into the stream port 183.

Still referring to FIG. 22, the spray head 100 further includes the nozzle assembly 158 and the aerator 160. The nozzle assembly 158 and the aerator 160 are in fluid communication with the manifold 140 and the water flow paths formed therein. By actuating the spray selection 110, a user can select between a spray stream in which the water is directed through the nozzle assembly 158 and an aerated stream in which the water is directed through the aerator 160.

The spray diverter piston assembly 179 includes a piston 173 that is configured to be inserted into the spray diverter chamber 180. The piston 173 includes a valve plug 166 structured to selectively seal against a valve seat 168 formed in the manifold 140. The spray diverter piston assembly 179 may be controlled (e.g., the piston 173 is urged in and out of the spray diverter chamber 180) by operation of the spray selection 110. According to an aspect, a spring (not shown) may normally maintain the piston 173 in an open position.

When the spray selection 110 is actuated or depressed by the user with a force greater than the resistance of the spring, the piston 173 moves toward a closed position.

When the spray selection 110 is actuated, the spray diverter piston assembly 179 moves into the closed position. In the closed position, the seal between the valve plug 166 and the valve seat 168 closes the aerator stream port 187, thereby preventing water from flowing into the aerator stream port 187 and thus diverting the water toward the nozzle stream port 189 (e.g., creating a spray stream). When the spray selection 110 is not actuated, the piston 173 remains in the open position, thereby allowing water to flow into the aerator stream port 187 (e.g., creating an aerated stream).

Figure 24:
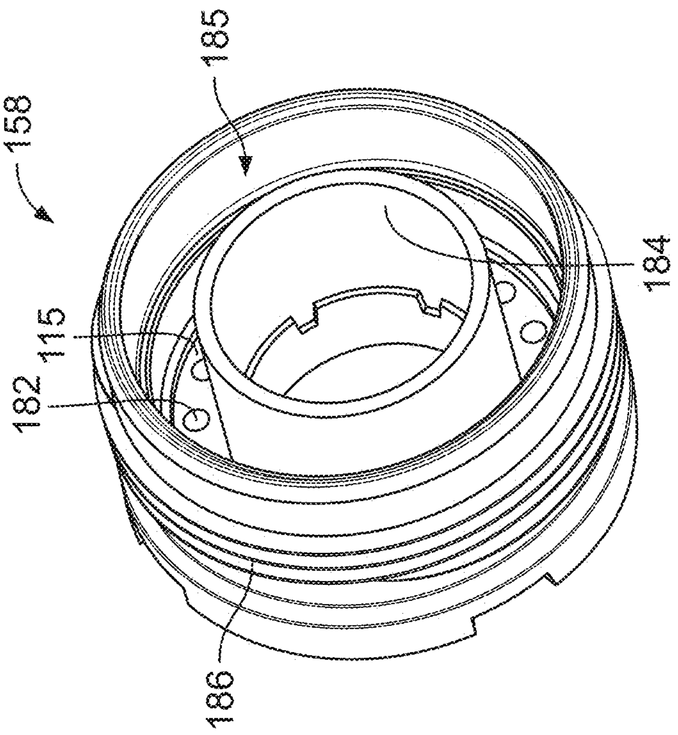
FIG. 24 illustrates a perspective view of the nozzle assembly of FIG. 23.
Figure 23:
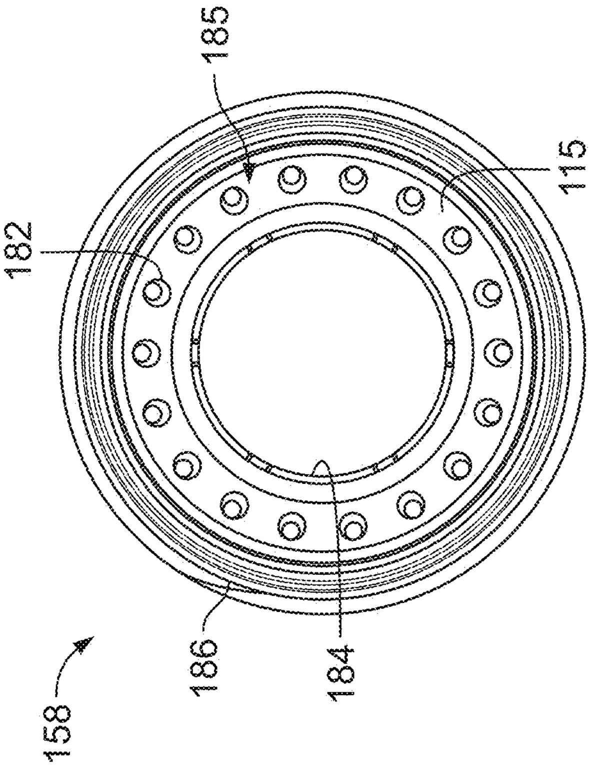
FIG. 23 illustrates a top view of a nozzle assembly of the spray head of FIG. 2.

Referring now to FIGS. 23-24, the nozzle assembly 158 is illustrated, according to some embodiments. The nozzle assembly 158 includes an internal wall 184 and an outer wall 186 forming a nozzle chamber 185 therebetween. Multiple nozzle apertures 182 extend between an inlet nozzle surface 115 to an outlet nozzle surface 113. When a user selects a spray stream (e.g., by actuating the spray selection 110), water flows into the nozzle chamber 185, through the nozzle apertures 182, and is expelled at the outlet nozzle surface 113 (shown in FIG. 22). An external thread may be positioned on the outer wall 186. As shown in FIG. 22, the external thread mates with internal threads on the bottom housing portion 106 to secure the nozzle assembly 158 within the spray head 100.

Figure 26:
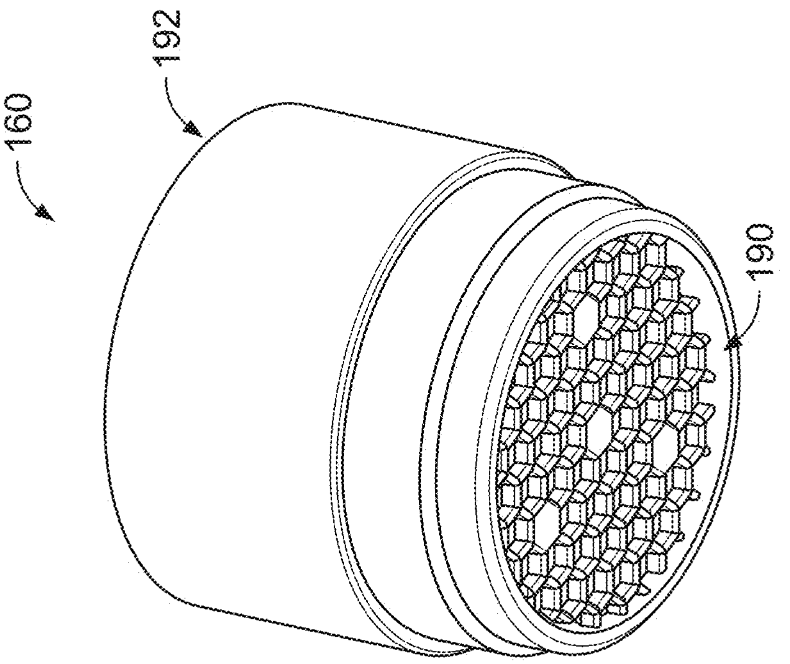
FIG. 26 illustrates a bottom perspective view of the aerator of FIG. 25.
Figure 25:
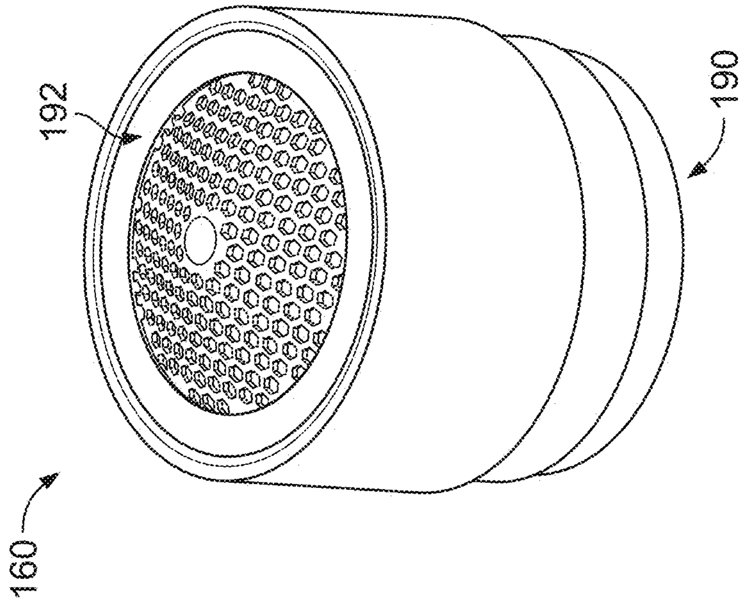
FIG. 25 illustrates a top perspective view of an aerator of the spray head of FIG. 2.

Referring now to FIGS. 25-26, the aerator 160 is illustrated, according to some embodiments. The aerator 160 includes an inlet 192 and an outlet 190. When an aerator stream is selected (e.g., by not actuating either the pause selection 108 or the spray selection 110), water flows into the aerator stream port 187 and through the aerator 160 (e.g., flowing from the inlet 192 through the outlet 190). As shown in FIG. 22, the aerator 160 is positioned within the internal wall 184 of the nozzle assembly 158 when assembled with the spray head 100.

Referring to FIGS. 27-30, in some examples, water may enter the inlet 120 of the spray head 100 and flow into the manifold 140, where the flow of water may be directed along a selected water flow path (e.g., a spray flow path, an aerated stream flow path, paused water flow) based on user actuation of the pause selection 108 and/or the spray selection 110.

Figure 27:
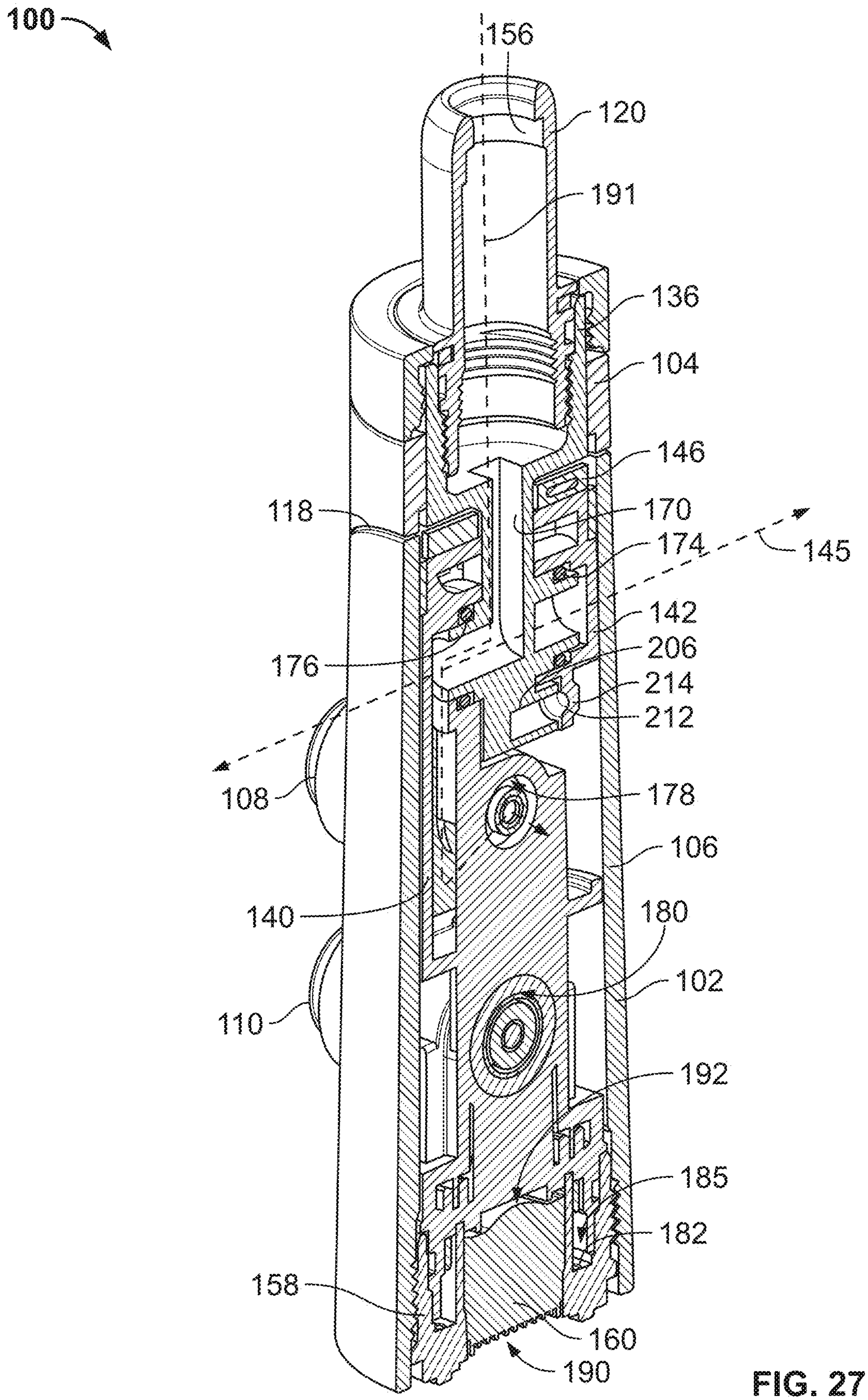
FIG. 27 illustrates a perspective section view of the spray head of FIG. 6 along section line 18-18.

In FIG. 27, an inlet water flow path 191 is depicted as a dashed line. Water enters the inlet 120, flows through the upper conduit 156, and into a first chamber 170 formed in the pivoting joint mechanism 138. The water may turn (e.g., an approximately 90-degree turn) and flow substantially along axis 145 through the pivoting joint mechanism 138. The water then flows downward (e.g., another approximately 90-degree turn) through the manifold 140 and into the pause diverter chamber 178.

Figure 28:
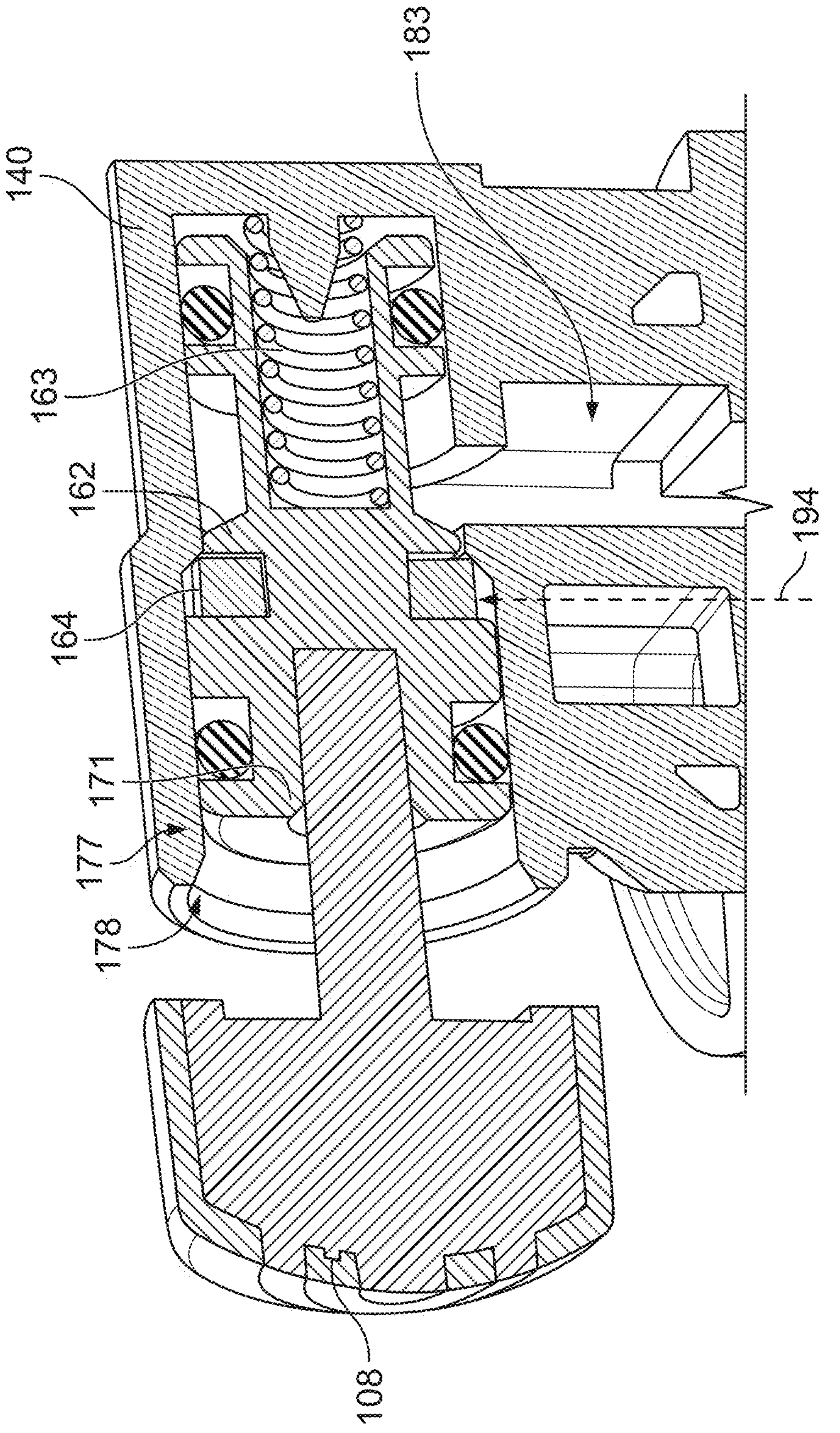
FIG. 28 illustrates a perspective section view of a portion of the spray head of FIG. 6 along section line 17-17 with the pause diverter assembly in a closed position.

Referring to FIG. 28, a paused water flow path 194 is depicted as a dashed line. Once water reaches the pause diverter chamber 178, water can either flow into the stream port 183 or be paused based on whether the user has actuated the pause selection 108. If a user actuates the pause selection 108, the pause diverter piston assembly 177 closes (e.g., valve plug 162 seals against valve seat 164) and the water flow is stopped from flowing through the pause diverter chamber 178 (and thus is paused from flowing through the spray head 100).

Figure 29:
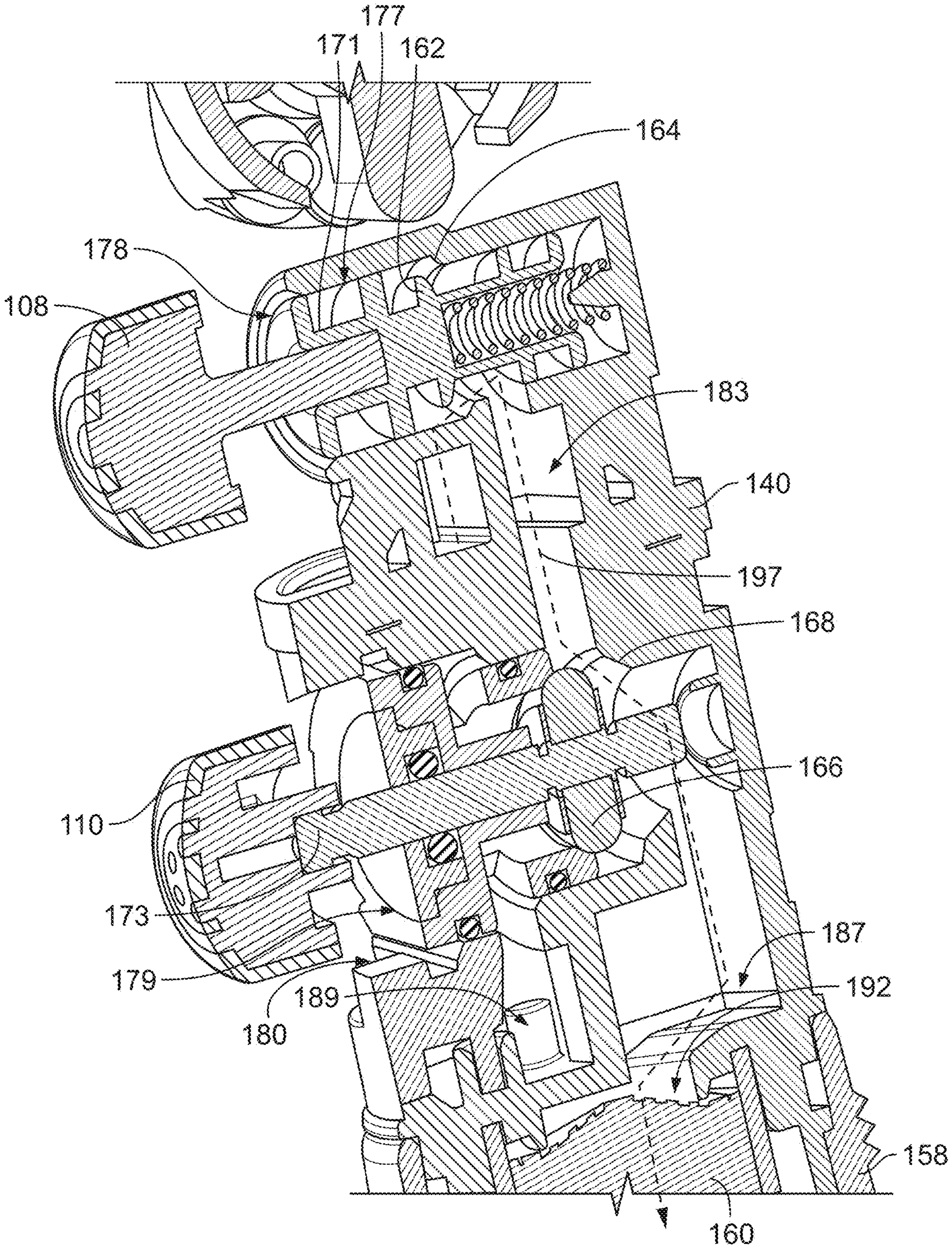
FIG. 29 illustrates a perspective section view of a portion of the spray head of FIG. 6 along section line 17-17 with the pause diverter assembly in an open position and the spray diverter assembly in an open position.

Referring to FIG. 29, an aerator flow path 197 is depicted by a dashed line. If a user does not actuate the pause selection 108, the pause diverter piston assembly 177 remains open and the water flows through the pause diverter chamber 178 and into stream port 183. At this point, the water in the stream port 183 flows downward to the spray diverter chamber 180. If a user similarly does not actuate the spray selection 110, the spray diverter piston assembly 179 remains open and the water flows into the aerator stream port 187. The water is expelled from the spray head 100 through the aerator 160.

Figure 30:
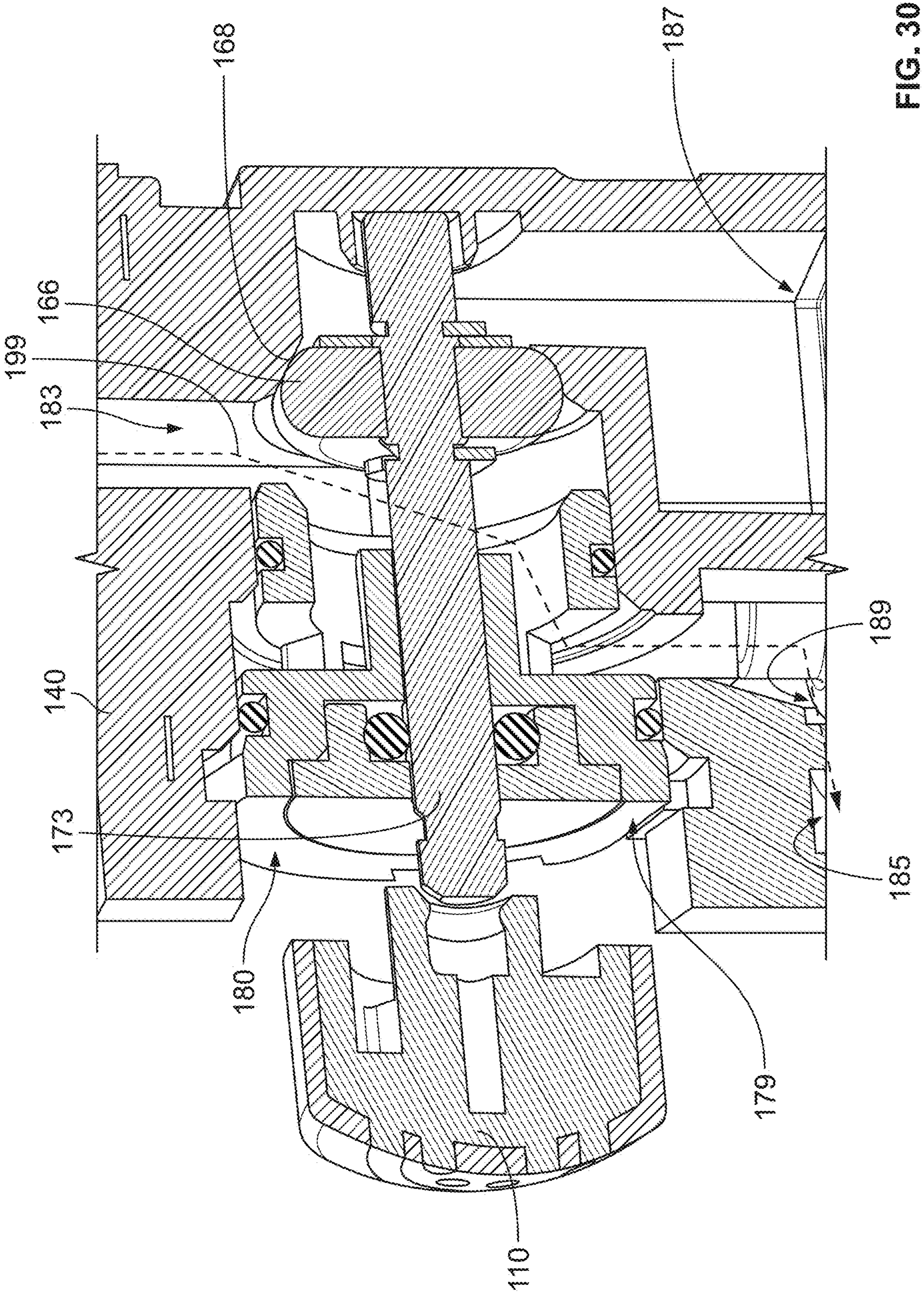
FIG. 30 illustrates a perspective section view of a portion of the spray head of FIG. 6 along section line 17-17 with the spray diverter assembly in a closed position.

Referring to FIG. 30, a spray flow path 199 is depicted by a dashed line. If a user actuates the spray selection 110, the spray diverter piston assembly 179 closes (e.g., valve plug 166 seals against valve seat 168) and the water is diverted into the nozzle stream port 189 and into the nozzle chamber 185. The water is expelled from the spray head 100 through the nozzle apertures 182 (shown in FIGS. 22-24).

Figure 31:
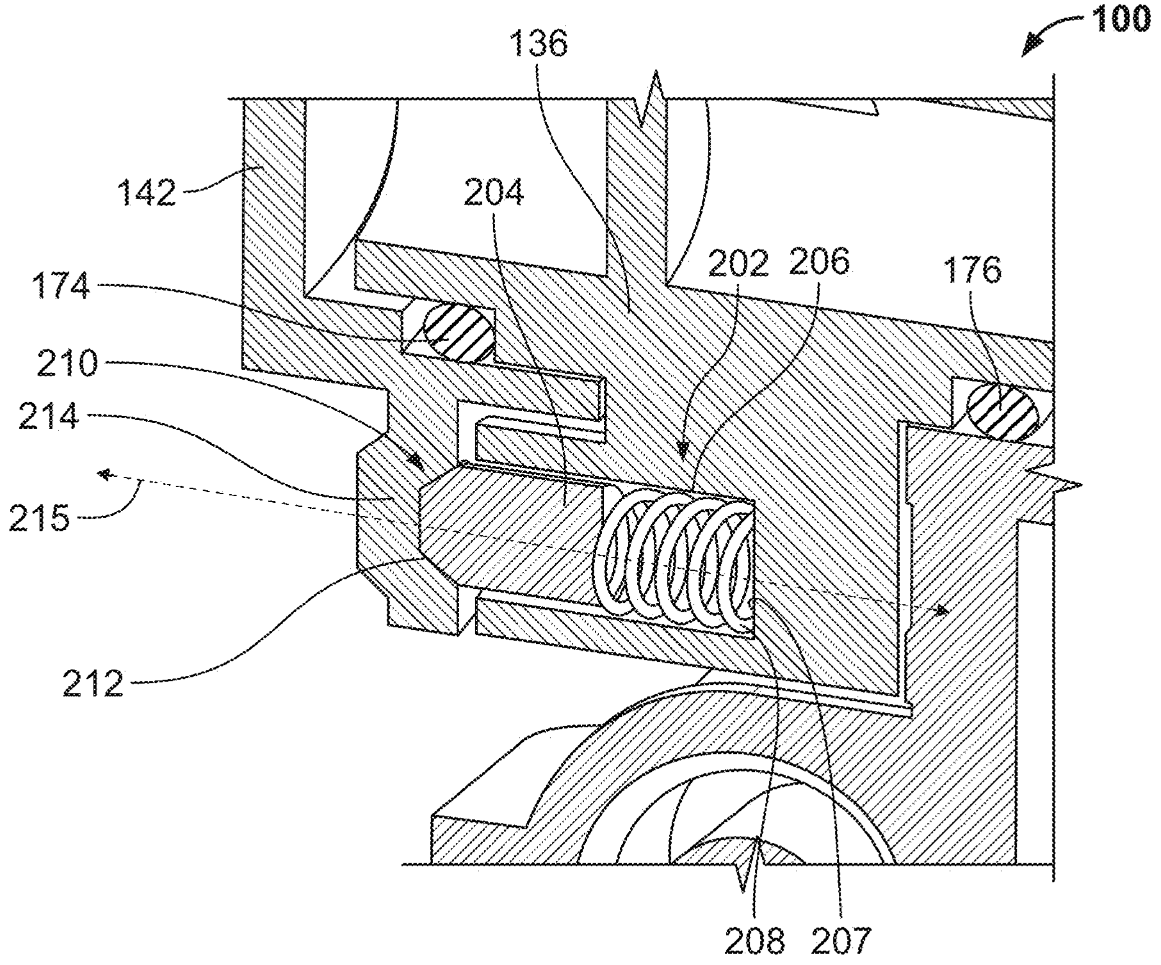
FIG. 31 illustrates a portion of the spray head of FIG. 2.

Referring to FIG. 31, a portion of the spray head 100 is shown, according to various embodiments. As shown, the spray head 100 includes a detent assembly 202. The detent assembly 202 includes a pin 204 positioned within a pin channel 206 (e.g., also shown in FIG. 27). The detent assembly 202 also includes a biasing member 208 positioned within the pin channel 206 between the pin 204 and in inner wall 207 of the pin channel 206. The pin 204 is movable between an outward pin position 210 and an inward pin position (not shown) along a pin axis 215. The pin 204 is biased by the biasing member 208 toward an outward pin position 210 as shown in FIG. 31.

The rotary member 142 of the pivoting joint mechanism 138 includes a detent flange 214 having a detent 212 structured to receive the pin 204 when the spray head 100 is in the home, unpivoted position (e.g., 0 degree pivot) shown in FIG. 1. As the spray head 100 is moved from a pivoted position to the unpivoted position, the pin 204 contacts the detent flange 214 and moves inward along axis 215 against the biasing force of the biasing member 208 and then moves outward along axis 215 into the detent 212 as shown in FIG. 31.

The detent assembly 202 maintains the spray head 100 in the unpivoted position until a user applies a pivot force great enough to overcome the force of the biasing member 208. Once the biasing force is overcome, the pin 204 moves inward along pin axis 215 into the pin channel 206 and out of the detent 212. The detent assembly 202 provides tactile feedback to the user to indicate that the spray head 100 is in the home, unpivoted position. In various embodiments, one or more other detent assemblies could be used with the spray head 100 to indicate different angles of pivot.

Figure 32:
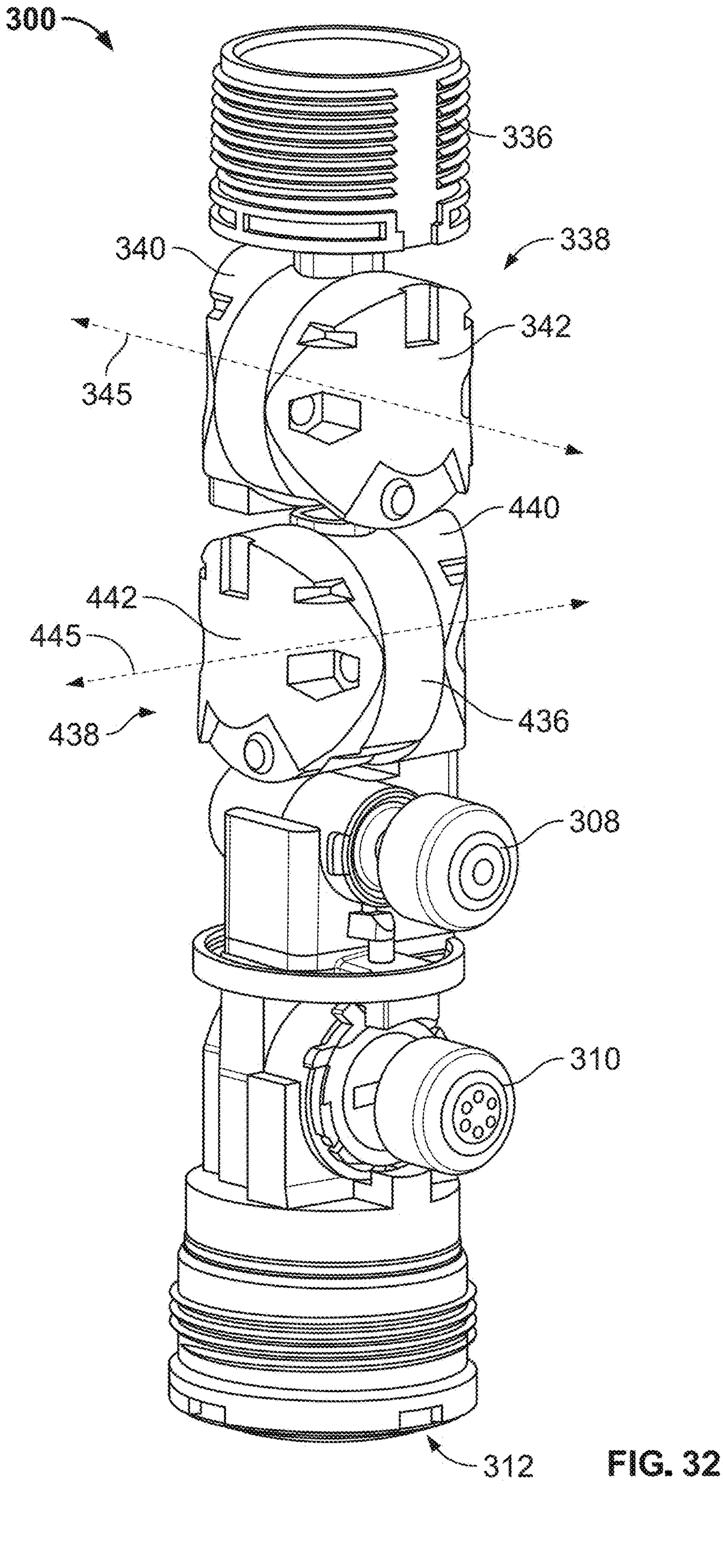
FIG. 32 illustrates a front perspective view of a spray head according to another embodiment.

Referring to FIG. 32, a spray head 300 according to another embodiment is shown. The spray head 300 includes multiple pivoting joint mechanisms 338, 438. The pivoting joint mechanism 338 includes a stationary member 336 coupled to a rotary member 342 and a manifold 340. The pivoting joint mechanism 438 includes a stationary member 436 coupled to a rotary member 442 and a manifold 440. The rotary member 342 rotates about an axis 345 relative to the stationary member 336 when the spray head 300 is pivoted about a first pivoting direction. The rotary member 442 rotates about an axis 445 relative to the stationary member 436 when the spray head 300 is pivoted about a second direction. In this way, when the spray head 300 is pivoted about the first direction, the rotary member 342 rotates causing the bottom housing portion to be rotated therewith and thus angularly displaces the bottom housing portion from the top housing portion in a first direction (e.g., at an angular displacement a shown in FIGS. 4-5). Additionally, when the spray head 300 is pivoted about the second direction, the rotary member 442 rotates causing the bottom housing portion to be rotated therewith and thus angularly displaces the bottom housing portion from the top housing portion in a second direction. Accordingly, the spray head 300 is pivotable about two degrees of freedom (e.g., front-to-back and side-to-side). The spray head 300 also includes a pause selection 308 and a spray selection 310 positioned thereon Referring to the Figures generally, in operation, the faucet 10 may be turned on. For example, the faucet 10 may be turned on via an actuation of the faucet handle 14, gesture, voice input, or via another actuation method. When the faucet 10 is turned on, water may be allowed to flow through the faucet hose 16 and into the spray head 100.

A user may choose whether to allow water to flow through the outlet 112 of the spray head 100 or to pause the water flow. For example, the pause selection 108 may be actuated by the user into a position where the pause mode is selected. In response to actuation of the pause selection 108, the water flow may be stopped/paused. For example, the pause diverter piston assembly 177 is closed through actuation of the pause selection 108 and seals within the manifold 140 to prevent water from flowing therethrough. If a user does not actuate the pause selection 108, water freely flows through the spray head 100.

A user may also choose whether to actuate a spray mode via input through the spray selection 110. In response to selection of the spray selection 110, the flow of water may be diverted along the spray flow path 199 within the spray head 100 and exits the spray head 100 through the nozzle assembly 158. If a user does not actuate the spray selection 110, the water flows along the aerator flow path 197 and exits the spray head 100 through the aerator 160.

Figure 33:
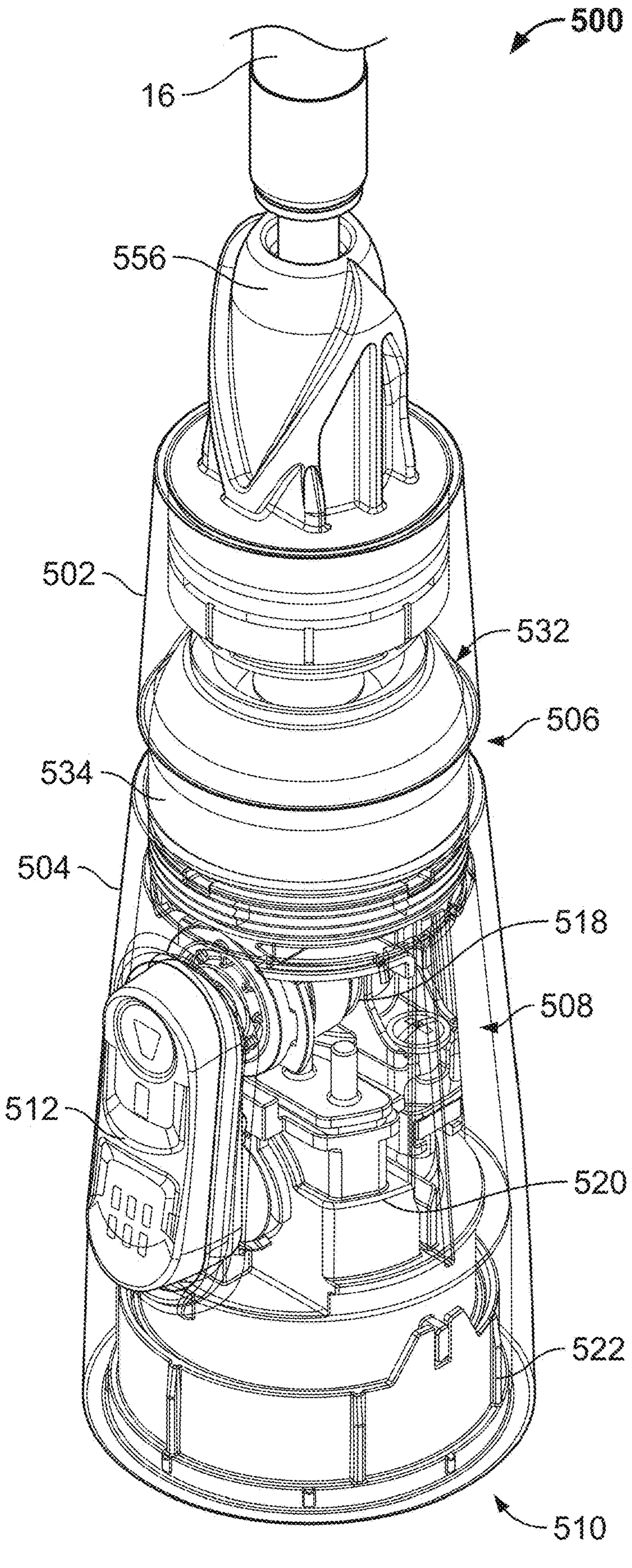
FIG. 33 illustrates a perspective view of another spray head according to the principles of the present disclosure.
Figure 34:
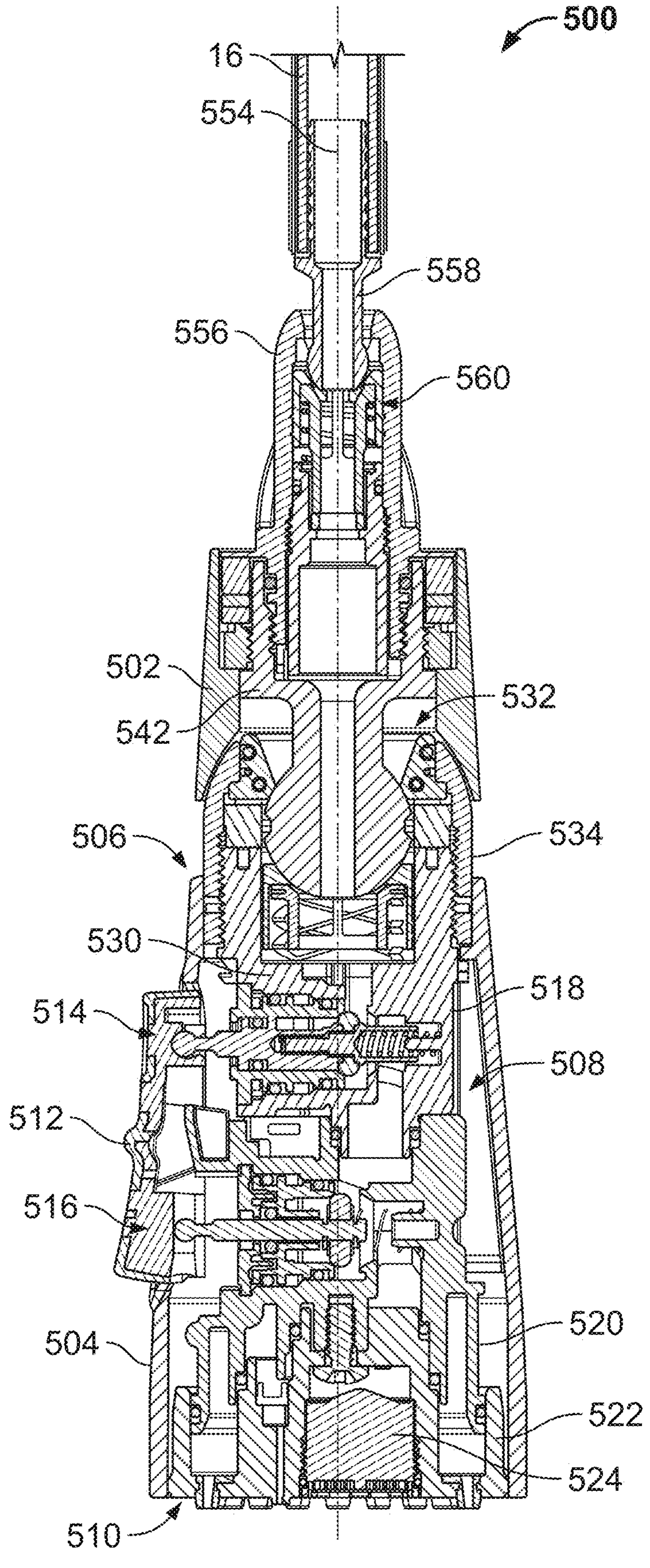
FIG. 34 illustrates a cross-sectional view of the spray head of FIG. 33.

FIG. 33 illustrates a perspective view of another spray head 500. FIG. 34 illustrates a cross-sectional view of the spray head 500. Referring concurrently to FIGS. 33 and 34, the spray head 500 is configured for connection to the faucet hose 16 and operates the same or similarly to the spray head examples described above. In this example, however, a pivot joint mechanism is formed from a ball joint, and thus, the spray head 500 is pivotable about 360 degrees. In an aspect, the pivotable movement of the spray head 500 may be a +/−20 degree tilt angle relative to a longitudinal axis and this tilt angle is available around 360 degrees around the longitudinal axis. The spray head 500 includes a housing (shown as transparent in FIGS. 33 and 34) with a top housing portion 502 and a bottom housing portion 504. A seam 506 separates the top and bottom housing portions 502, 504 so as to enable pivoting of the bottom housing portion 504 relative to the top housing portion 502. In this example, the seam 506 is formed as a gap and the top housing portion 502 is separated by a space from the bottom housing portion 504.

Figure 35:
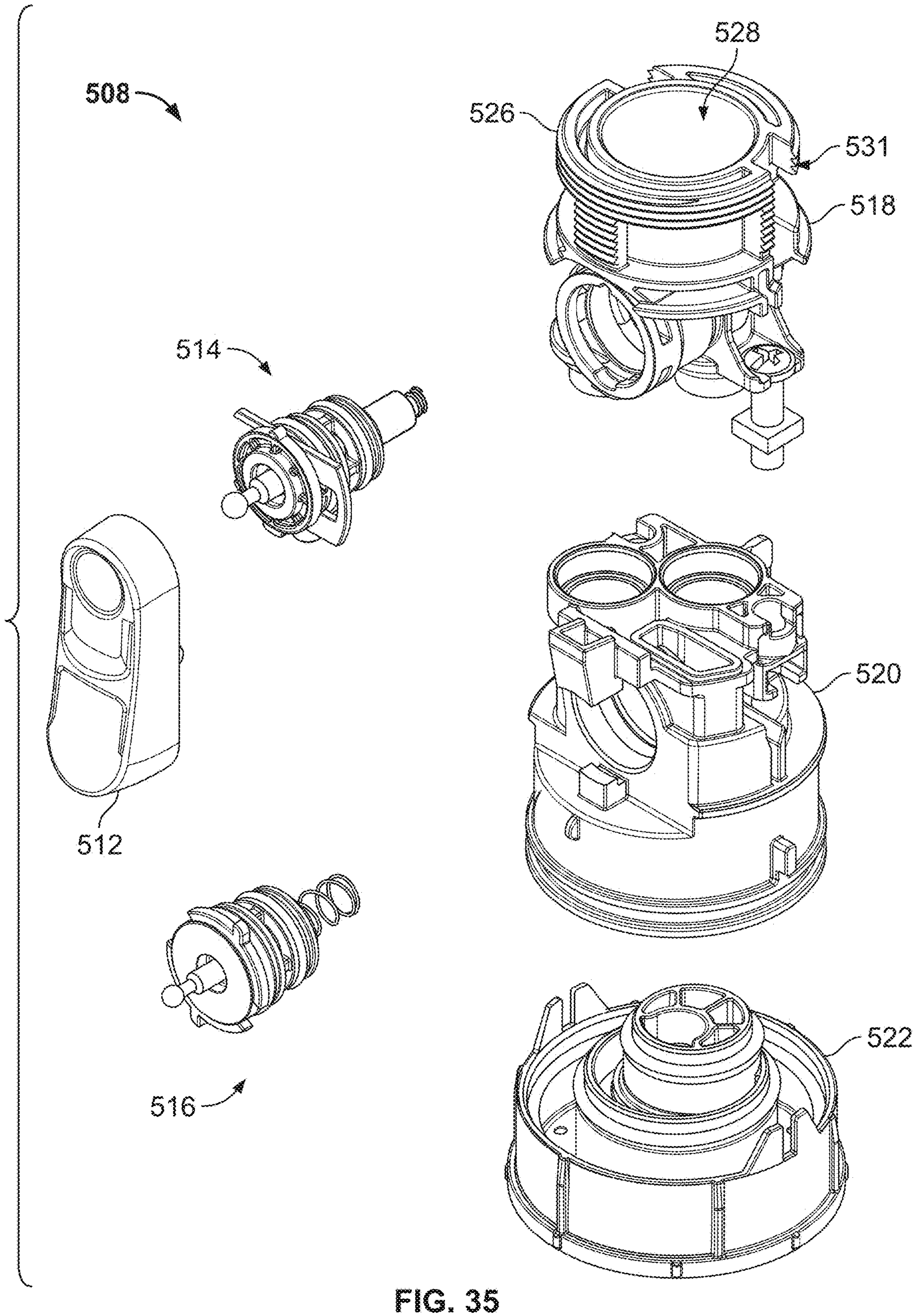
FIG. 35 illustrates an exploded, perspective view of a spray control assembly of the spray head of FIG. 33.

The bottom housing portion 504 houses a spray control assembly 508 that allows the user to toggle characteristics of the water expelled at a spray head outlet 510. FIG. 35 illustrates an exploded, perspective view of the spray control assembly 508. Referring now to FIGS. 33-35, the spray control assembly 508 includes a rocker button 512 pivotably mounted on the bottom housing portion 504 and engaged with a hydro blade diverter piston assembly 514 and a spray diverter piston assembly 516. The hydro blade diverter piston assembly 514 is supported in a first manifold 518 and the spray diverter piston assembly 516 is supported in a second manifold 520. In this example, the rocker button 512 is used to toggle between a hydro blade pattern and a sprayer patter and in a similar operation to what is described above. Other and/or additional spray patterns are also contemplated herein. The first manifold 518 is coupled to the second manifold 520 so as to define one or more flow paths therein. Additionally, the spray control assembly 508 includes a nozzle assembly 522 having an aerator 524. A top end of the first manifold 518 includes a threaded outer surface 526 and defines an inner cylindrical chamber 528 at least partially defined by one or more seats 530. Additionally, one or more longitudinal channels 531 are defined on the outer surface of the top end of the first manifold 518. The top end of the first manifold 518 is configured to couple to a pivoting joint mechanism 532 and allow water to flow from the pivoting joint mechanism 532 and into the spray control assembly 508.

Figure 36:
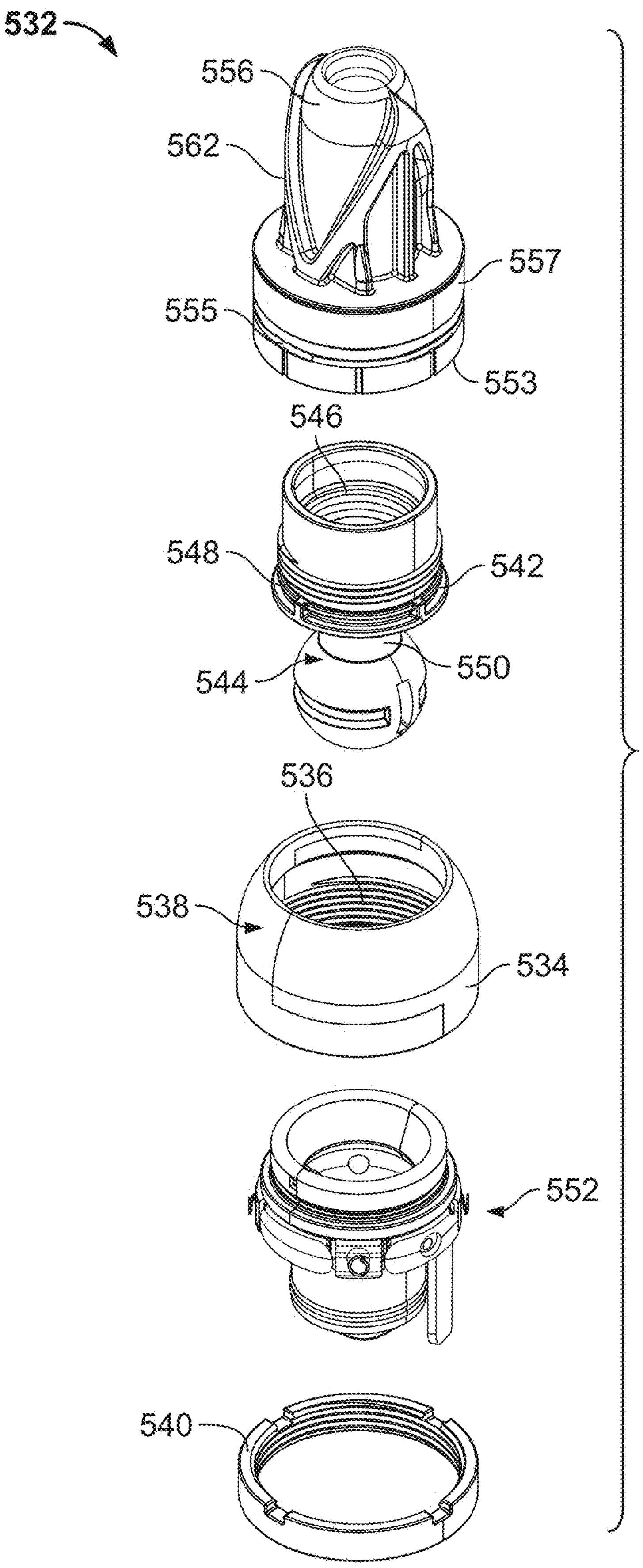
FIG. 36 illustrates an exploded, perspective view of a pivoting joint mechanism of the spray head of FIG. 33.

FIG. 36 illustrates an exploded, perspective view of the pivoting joint mechanism 532. Referring now to FIGS. 33, 34, and 36, the pivoting joint mechanism 532 is coupled to both the top and bottom housing portions 502, 504 and enables the movement of the bottom housing portion 504 relative to the top housing portion 502 as described herein. The pivoting joint mechanism 532 includes a shroud 534 with internal threads 536 at one end that couples to the threaded outer surface 526 of the first manifold 518. The other end of the shroud 534 has a smooth curved outer surface 538 that corresponds to an inner surface of the top housing portion 502. The shroud 534 has a length so that it spans the seam 506 between the top and bottom housing portions 502, 504. In the example, a nut 540 may have inner threads to connect with the first manifold 518 (shown in FIG. 35) and an outer surface that couples to the bottom housing portion 504 (shown FIG. 34) so as to couple the bottom housing portion 504 to the first manifold 518.

A ball joint body 542 includes a bottom end that forms a substantially spherical outer surface 544 and a top end with inner threads 546 and outer threads 548. The top and bottom ends are separated by a reduced diameter shaft 550. The spherical outer surface 544 is configured to be received within the shroud 534 and held within via a ball joint coupler 552. The ball joint coupler 552 engages both the upper and lower portions of the spherical outer surface 544 so as to capture the ball joint body 542 while also enabling the bottom housing portion 504 and the components therein to pivot about a longitudinal axis 554 of the spray head 500. The ball joint coupler 552 is described in further detail below.

The pivoting joint mechanism 532 also includes a hose nut 556 with a bottom end configured to engage with the inner threads 546 of the top end of the ball joint body 542 and a top end configured to engage with the faucet hose 16. The top end of the hose nut 556 also forms the inlet to the spray head 500. In the example, the faucet hose 16 includes a minor ball joint body 558 that is configured to be received at least partially within the top end of the hose nut 556 and captured therein with a minor ball joint coupler 560. This connection enables the hose nut 556 to rotate 360 degrees around the longitudinal axis 554 and pivot relative to the faucet hose 16. The outer surface of the top end of the hose nut 556 includes one or more alignment features 562 configured to align the spray head 500 within the second end 22 of the faucet body 12 (both shown in FIG. 1) when received therein. For example, when the spray head 500 is coupled to the faucet body 12, the rocker button 512 is always positioned in a rearward facing direction. Some of the features of the hose nut are described in further detail in U.S. Pat. No. 11,053,670 which is incorporated by reference herein in its entirety.

Figure 41:
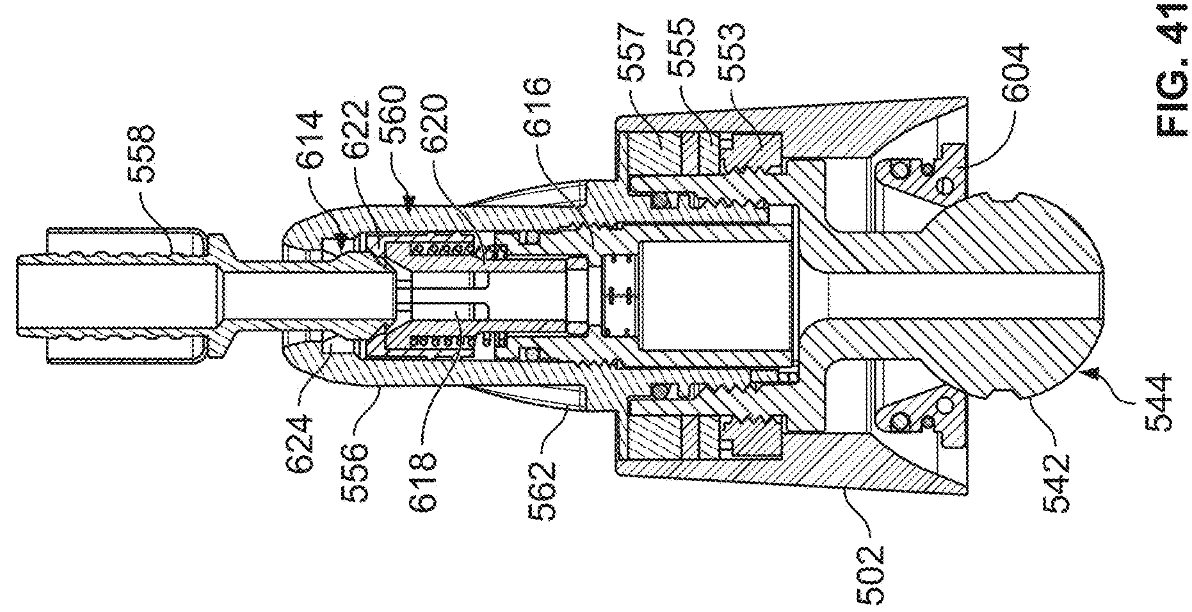
FIG. 41 illustrates a cross-sectional view of a minor ball joint coupler of the spray head of FIG. 33.

On the bottom end of the hose nut 556 a retainer nut 553 is provided to engage with the outer threads 548 of the ball joint body 542 and hold the top housing portion 502 (shown in FIG. 34) to the ball joint body 542. Additionally, a foam washer 555 and a magnet 557 are provided under a flange of the hose nut 556. The magnet 557 is configured to facilitate an auto-alignment feature of the hose nut 556. FIG. 41 illustrates this configuration in further detail.

Figure 38:
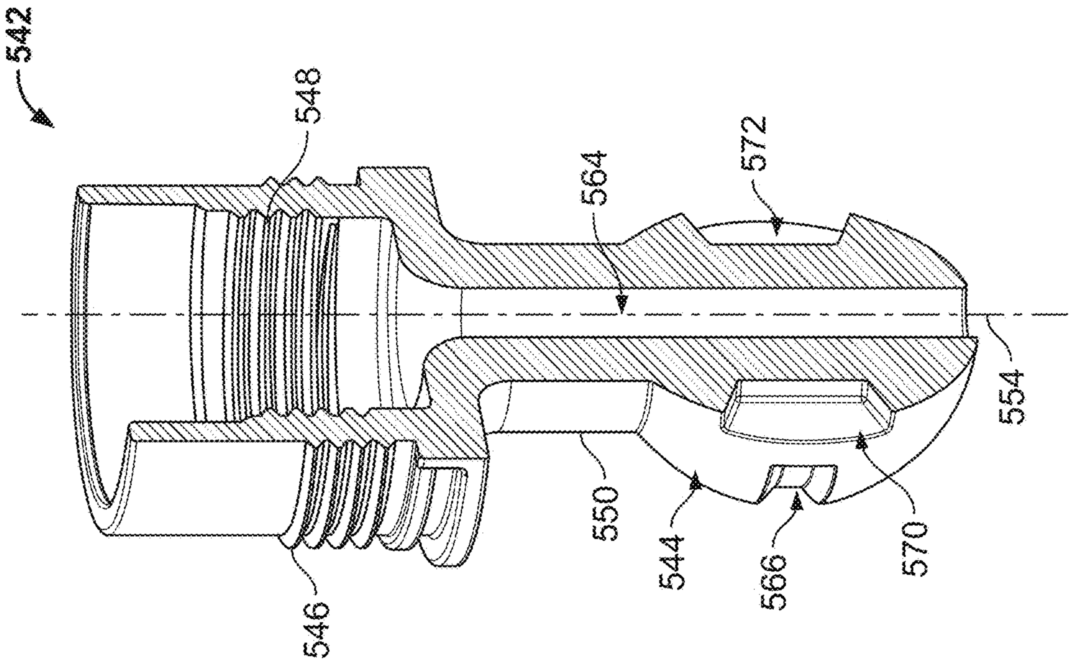
FIG. 38 illustrates a cross-sectional view of the ball joint body of FIG. 37.
Figure 37:
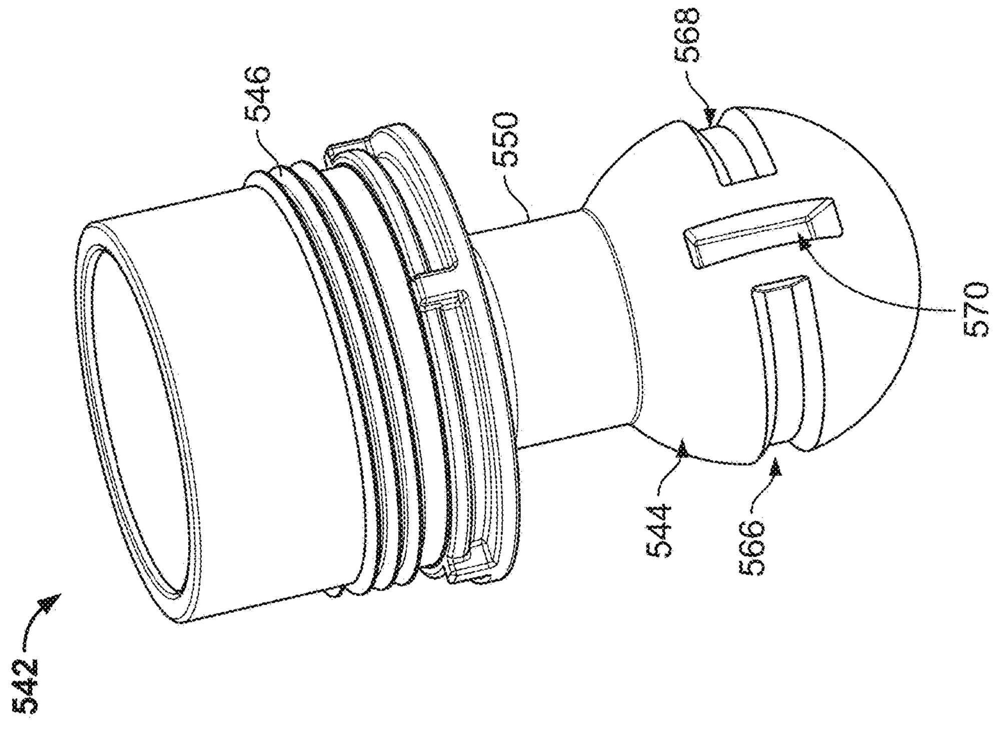
FIG. 37 illustrates a ball joint body of the pivoting joint mechanism of FIG. 36.

FIG. 37 illustrates the ball joint body 542. FIG. 38 illustrates a cross-sectional view of the ball joint body 542. Referring concurrently to FIGS. 37 and 38, the ball joint body 542 includes the spherical outer surface 544 on the bottom end, the shaft 550, and inner and outer threads 546, 548 proximate the top end. A through opening 564 extends the entire length of the ball joint body 542 and allows water to flow into the manifold(s). The spherical outer surface 544 includes first and second circumferential grooves 566, 568 (e.g., raceways) located at the equator of the ball joint and first and second axial grooves 570, 572 (e.g., raceways) located at the meridian of the ball joint. Circumferential, axial, equator, and meridian are orientations with respect to the longitudinal axis 554. In an aspect, the ball joint body 542 is formed as a unitary body.

Figure 39:
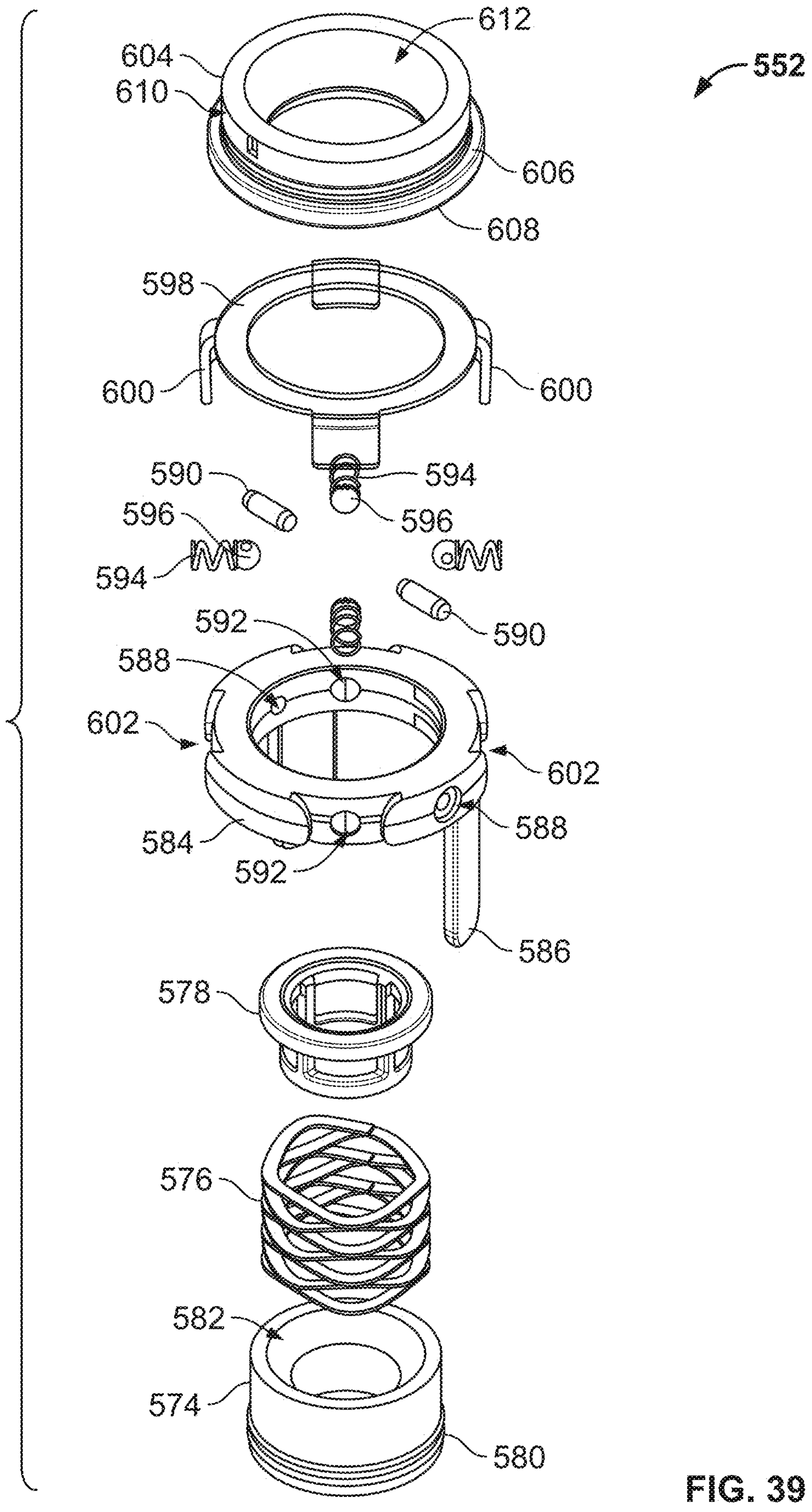
FIG. 39 illustrates an exploded, perspective view of a ball joint coupler of the pivoting joint mechanism of FIG. 36.

FIG. 39 illustrates an exploded, perspective view of the ball joint coupler 552. The ball joint coupler 552 includes a seal 574, a spring 576, and a piston 578, each configured to be disposed within the inner cylindrical chamber 528 of the first manifold 518 (both shown in FIG. 35) and below the ball joint body 542 (shown in FIG. 37) when assembled. The seal 574 includes one or more exterior circumferential ribs 580 on the exterior and an oblique surface 582 at the top end. The circumferential ribs 580 can engage with the surface of the inner cylindrical chamber 528. The oblique surface 582 contacts the spherical outer surface 544 (shown in FIG. 37) of the ball joint body 542. As such, the seal 574 enables for seals to be formed between the ball joint body 542 and the first manifold 518 and water to flow therethrough. In an aspect, the seal may be formed with an elastomeric or rubber based material, and thus, when water pressure increases, the sealing force of the seal 574 increases. The spring 576 and the piston 578 are disposed within the seal 574. In the example, the piston 578 is disposed under a shoulder formed underneath the oblique surface 582. The piston 578 is biased in an upward direction via the spring 576 so as to urge the oblique surface 582 of the seal 574 into contact with the spherical outer surface 544. In an aspect, the spring 576 may be a stacked wave spring or a compression spring as required or desired. The spring 576 can sit on the one or more seats 530 (shown in FIG. 34) formed in the first manifold 518.

The ball joint coupler 552 also includes a collar 584 that is configured to be disposed on top of the first manifold 518. On the bottom of the collar 584, one or more legs 586 extend therefrom and are configured to be received at least partially within the corresponding longitudinal channels 531 (shown in FIG. 35) of the first manifold 518. The legs 586 and the channels 531 are configured to rotationally position the collar 584 relative to the longitudinal axis. A pair of first openings 588 are defined within the collar 584 and extend radially through the body. The first openings 588 are spaced 180 degrees apart from each other and are configured to support a static pin 590 therein. The static pin 590 is configured to extend inwards from the collar 584. In an example, the static pin 590 may be a coiled spring pin to frictionally engage with the collar 584 and maintain position. Additionally, a plurality of second openings 592 are defined within the collar 584 and extend radially through the body. The second openings 592 may have four openings that are spaced 90 degrees apart from each other and are configured to support a spring 594 and a roller ball 596 therein. The roller balls 596 are configured to be biased radially inwardly relative to the collar 584 and via the springs 594. In an example, the springs 594 are a compression spring and the roller balls 596 are a stainless steel ball. A clip 598 is used to keep the springs 594 within the second openings 592 and may engage over the top of the collar 584 with tabs 600 that engage with corresponding slots 602 within the outer surface of the collar 584. In an aspect, the clip 598 facilitates assembly of the collar 584 with the ball joint body 542.

Figure 40:
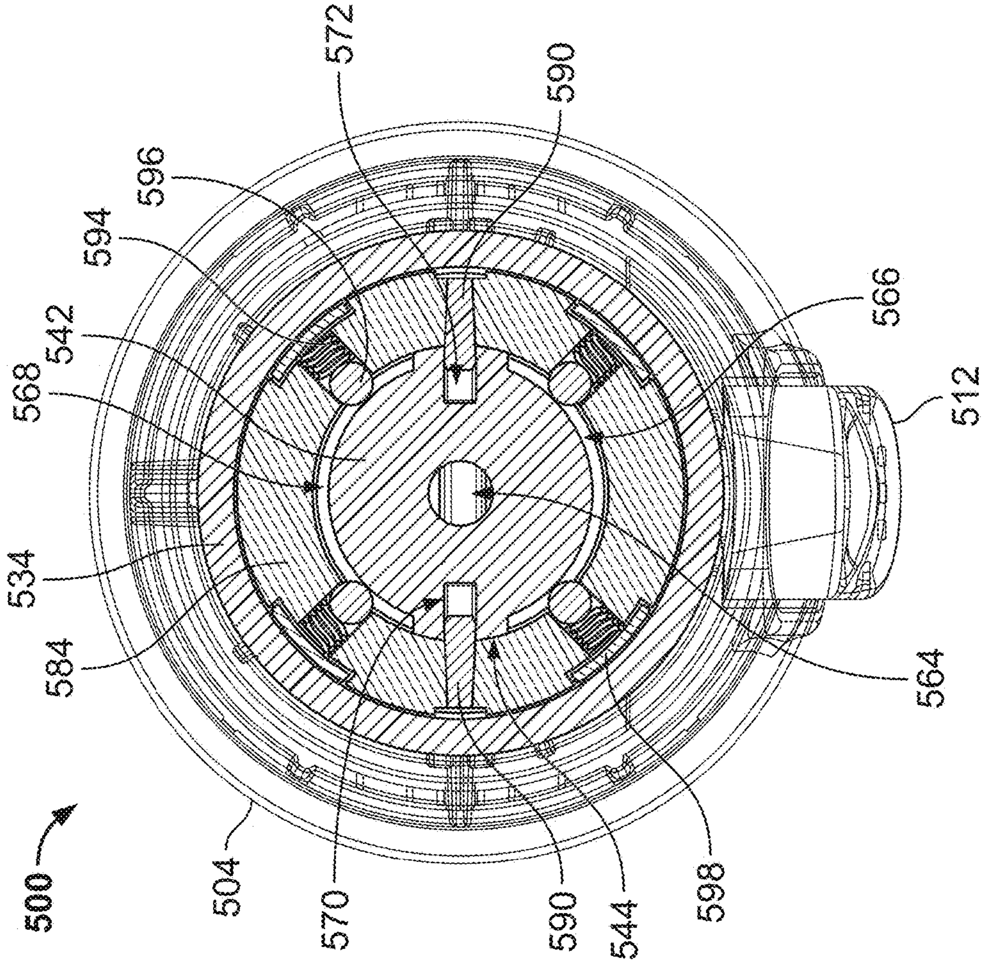
FIG. 40 illustrates an axial cross-sectional view of the spray head of FIG. 33.

Turning to FIG. 40, FIG. 40 illustrates an axial cross-sectional view of the spray head 500 at the collar 584. The collar 584 is disposed within the shroud 534 and the ball joint body 542 is disposed within the collar 584 with the through opening 564 extending along the longitudinal axis. A pair of static pins 590 are supported by the collar 584 and the distal ends of the static pins 590 extend into the corresponding axial grooves 570, 572 defined within the spherical outer surface 544. The engagement between the static pins 590 and the axial grooves 570, 572 restricts rotation of the bottom housing portion 504 around the longitudinal axis. This enables for the rocker button 512 to always be oriented towards the rear of the faucet. However, the axial grooves 570, 572 are elongated in an axial direction (e.g., parallel to the longitudinal axis), and as such, the bottom housing portion 504 is still enabled to be pivoted relative to the longitudinal axis with the static pins 590 sliding within the axial grooves 570, 572. In an aspect, the static pins 590 are spaced approximately 180 degrees relative to each other. In an aspect, the button 512 is disposed between the static pins 590.

Additionally, the roller balls 596 are biased via the springs 594 into the circumferential grooves 566, 568 defined within the spherical outer surface 544. When the roller balls 596 are at least partially disposed within the circumferential grooves 566, 568, the bottom housing portion 504 is aligned with the longitudinal axis. However, when the bottom housing portion 504 is pivoted, the roller balls 596 can move out of the circumferential grooves 566, 568 and roll along the spherical outer surface 544. As such, the roller balls 596 can roll both below and above the circumferential grooves 566, 568. In an aspect, when pivoted one or more roller ball 596 may be below a groove and one or more roller ball 596 may be above a groove. The biasing of the roller balls 596 can assist in maintaining the pivoted position of the spray head 500. The circumferential grooves 566, 568 also provide a home position for the bottom housing portion 504 that is enabled to be pivoted out of. In an aspect, the circumferential grooves 566, 568 provide tactile and/or an audible click for the user when in operation and when the spray head 500 is centered.

Turning back to FIG. 39, the ball joint coupler 552 further includes a top bushing 604. The top bushing 604 may have a two piece construction so that it can capture the top portion of the spherical outer surface 544 proximate the shaft 550 (both shown in FIG. 37). A clip 606 can be used to couple the two pieces together and form the top bushing 604. In an aspect, the top bushing 604 is formed from a plastic or plastic-based material. The top bushing 604 has a bottom end 608 configured to be placed on top of the clip 598. A top end of the bushing 604 includes a radially outer surface 610 that engages with the shroud 534 (shown in FIG. 34) and so that the ball joint coupler 552 couples to the top of the first manifold 518 (shown in FIG. 35). A radially inner surface 612 is an oblique surface and is configured to act as a pivot stop and contact the shaft 550 to form a pivot boundary for the spray head 500.

During assembly, the seal 574, spring 576, and piston 578 are placed within the top of the first manifold 518. Additionally, the collar 584 is positioned at the top of the first manifold 518. The spherical outer surface 544 of the ball joint body 542 is at least partially inserted into the collar 584 with the roller balls 596 riding in the circumferential grooves 566, 568 and the static pins 590 inserted into the axial grooves 570, 572. The top bushing 604 is attached at least partially around the shaft 550 and above the collar 584. The shroud 534 threads onto the top of the first manifold 518 and compresses the top bushing 604, clip 598, and collar 584 into the top of the first manifold 518. This captures the spherical outer surface 544 within the ball joint coupler 552 and enables pivoting movement thereof. The spring 576 generates an upward force on the bottom of the spherical outer surface 544 via the seal 574 and this is the force that the user overcomes to pivot the spray head 500. The top bushing 604 restricts movement of the spherical outer surface 544 upward along the longitudinal axis. By using the shroud 534 to couple the ball joint coupler 552 to the first manifold 518, and because of the stacked configuration of the top bushing 604 and collar 584 above the first manifold 518, torque applied by the shroud 534 is transferred directly into the first manifold 518 and not into the spring 576. This configuration increases the amount of assembly torque the spray head 500 can withstand without affecting the pivoting movement of the spray head 500.

FIG. 41 illustrates a cross-sectional view of the minor ball joint coupler 560 of the spray head 500 (shown in FIG. 34). Certain components are described above, and thus, not necessarily described further. The hose nut 556 at its top end couples to the hose via the minor ball joint body 558. The minor ball joint coupler 560 captures a minor spherical outer surface 614 of the minor ball joint body 558 within the hose nut 556 and allows for pivoting movement. An inner sleeve 616 couples within the hose nut 556 and supports a spring 618. The spring 618 biases a piston 620 and a seal 622 to hold the bottom of the minor spherical outer surface 614. A top bushing 624 is positioned above the minor spherical outer surface 614 to capture the minor ball joint body 558. In an aspect, the minor spherical outer surface 614 has a smaller diameter than the spherical outer surface 544 of the ball joint body 542. The minor ball joint coupler 560 does not restrict rotation of the spray head 500 around the longitudinal axis and relative to the faucet hose.

Figure 42:
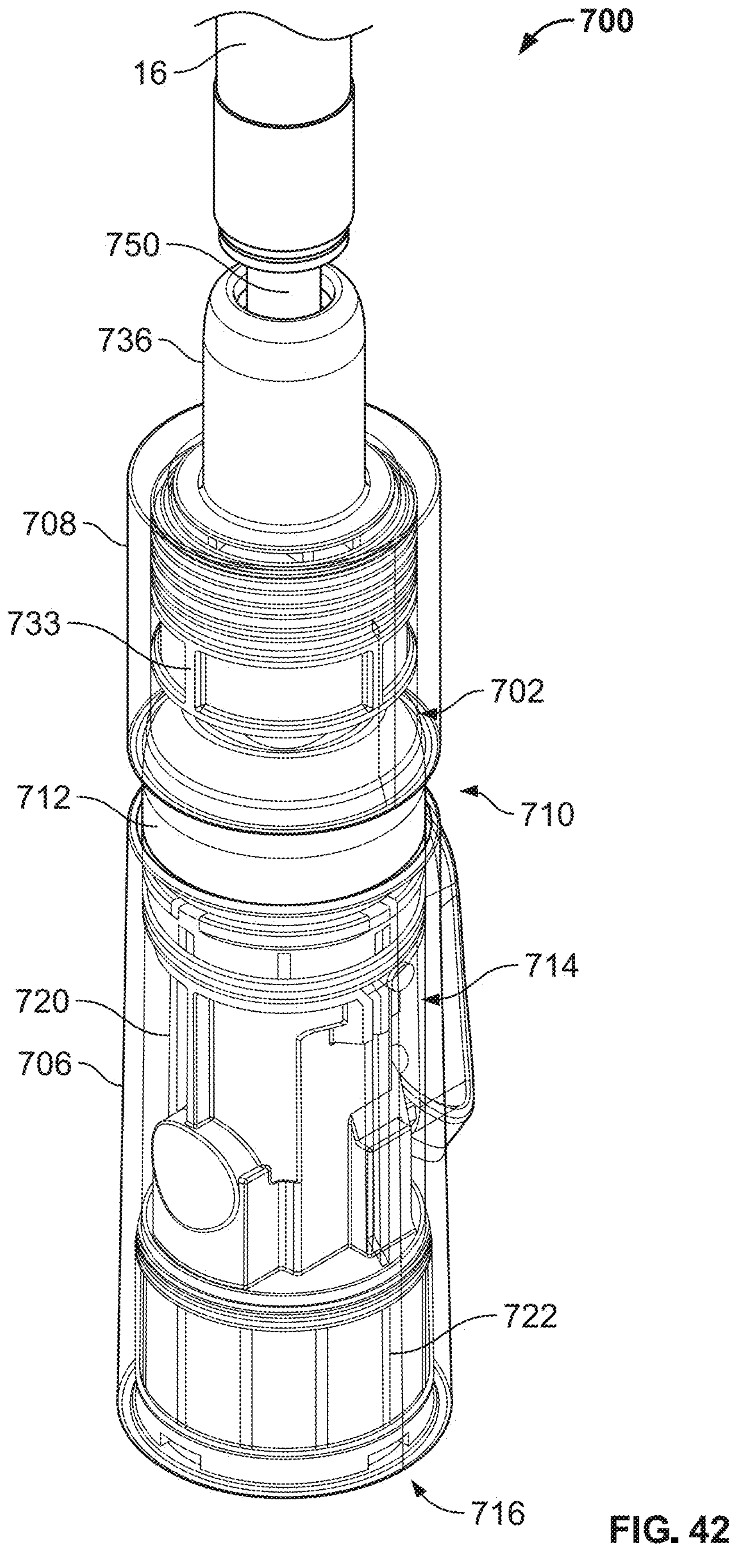
FIG. 42 illustrates a perspective view of another spray head according to the principles of the present disclosure.
Figure 43:
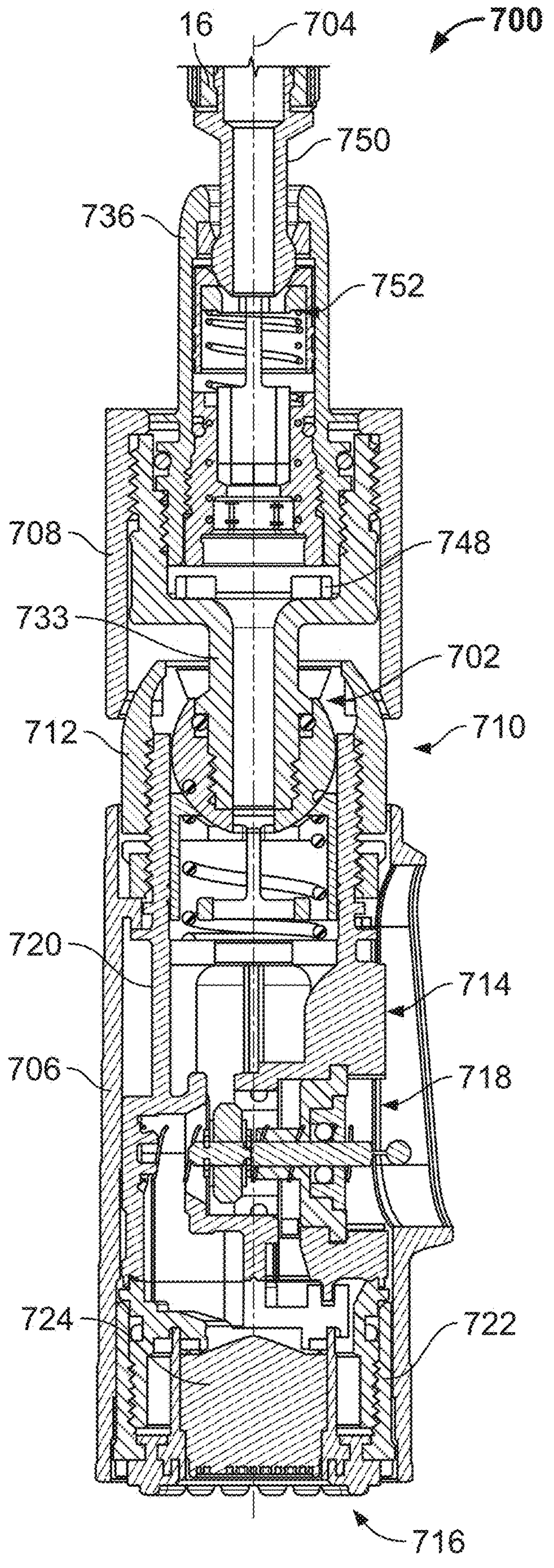
FIG. 43 illustrates a cross-sectional view of the spray head of FIG. 42.
Figure 44:
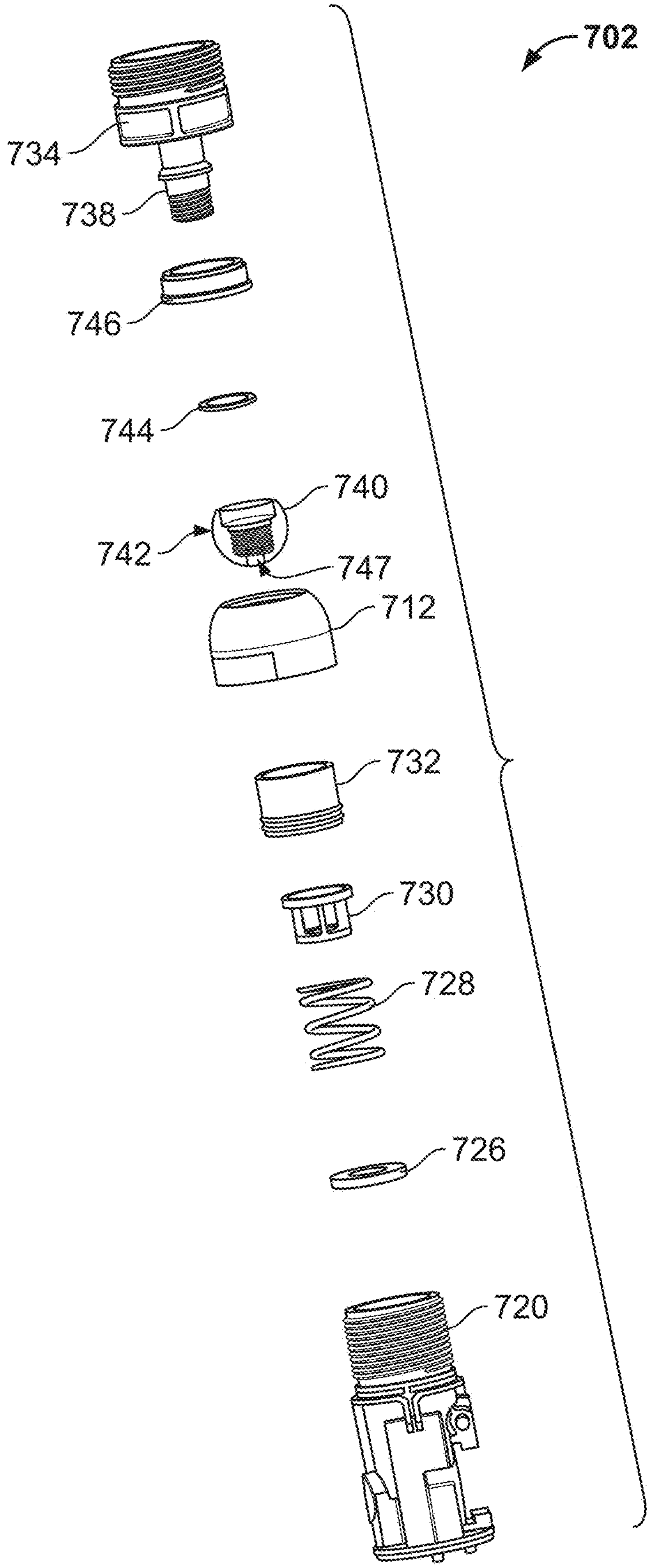
FIG. 44 illustrates an exploded, perspective view of a pivoting joint mechanism of the spray head of FIG. 42.

FIG. 42 illustrates a perspective view of another spray head 700. FIG. 43 illustrates a cross-sectional view of the spray head 700. FIG. 44 illustrates an exploded, perspective view of a pivoting joint mechanism 702 of the spray head 700. Referring concurrently to FIGS. 42-44, the spray head 700 is configured for connection to the faucet hose 16 and operates the same or similarly to the spray head examples described above. In this example, however, a pivot joint mechanism is formed from a ball joint, and thus, the spray head 700 is pivotable about 360 degrees and similar to the spray head 500 described above. In this example, however, the ball joint has a more simplified configuration and does not restrict rotation around a longitudinal axis 704. As such, a bottom housing portion 706 is rotatable around the longitudinal axis 704 relative to a top housing portion 708 in addition to being pivotable with respect thereto. This configuration enables for the overall outside diameter of the spray head 700 to be reduced. The bottom and top housing portions 706, 708 are illustrated as transparent in the figures. A scam 710 separates the bottom and top housing portions 706, 708 with a shroud 712 disposed underneath.

The bottom housing portion 706 houses a spray control assembly 714 that allows the user to toggle characteristics of the water expelled at a spray head outlet 716. The spray control assembly 714 includes a button (not shown) mounted on the bottom housing portion 706 and engaged with a piston assembly 718. The piston assembly 718 is supported in a manifold 720. In this example, the button is used to toggle to a sprayer patter and in a similar operation to what is described above. Other and/or additional spray patterns are also contemplated herein. Additionally, the spray control assembly 714 includes a nozzle assembly 722 having an aerator 724. A top end of the manifold 720 includes a threaded outer surface configured to couple to the shroud 712 of the pivoting joint mechanism 702.

Additionally, the top end of the manifold 720 includes a cylindrical inner chamber configured to receive a washer 726, a spring 728, a piston 730, and a seal 732 of the pivoting joint mechanism 702. The washer 726 is configured to support the spring 728 within the manifold 720, and the spring 728, piston 730, and seal 732 are configured to engage and generate an upward force on a ball joint body 733. The ball joint body 733 includes a nut member 734 with a top end that threadably engages with the top housing portion 708 and a hose nut 736. The nut member 734 also includes a shaft 738 with a threaded distal end. The distal end of the shaft 738 is configured to couple to a separate ball member 740 to form a spherical outer surface 742. In the example, an O-ring seal 744 is disposed between the nut member 734 and the ball member 740. Additionally, the pivoting joint mechanism 702 includes a top bushing 746 that restricts the spherical outer surface 742 from being pulled out of the shroud 712 and sits on the top end of the manifold 720.

In this example, the spherical outer surface 742 does not include any channels, and thus, there is no collar to prevent rotation around the longitudinal axis 704. However, the spherical outer surface 742 is captured between the seal 732 and top bushing 746 in a similar manner to that described above and which forms the ball joint coupler. In order to facilitate the nut member 734 threadingly engaging with the ball member 740 to form the ball joint body 733, the ball member 740 may include hex drive feature 747 and the inside of the nut member 734 may include one or more protrusions 748 to facilitate coupling the two components together.

The hose nut 736 has a bottom end configured to engage with the inner threads of the top end of the ball joint body 733 and a top end configured to engage with the faucet hose 16. In the example, the top end of the hose nut 736 does not include an alignment features, thus, the spray head 700 can dock with the faucet in any orientation. In some example, one or more components (e.g., the hose nut 736) may be formed from a magnetic material in order to facilitate a soft close configuration. The faucet hose 16 includes a minor ball joint body 750 that is configured to be received at least partially within the top end of the hose nut 736 and captured therein with a minor ball joint coupler 752. The configuration of the minor ball joint coupler 752 is similar to that described above with an inner sleeve, a piston, a spring, a seal, and a top bushing.

EXAMPLES

Illustrative examples of the spray head and/or faucet assembly described herein are provided below. An embodiment of the spray head and/or faucet assembly may include any one or more, and any combination of, the examples described below.

In Example 1, a spray head for connection to a faucet for expelling water comprises: a spray head top portion comprising an inlet to receive water from the faucet and a spray head bottom portion comprising an outlet to expel water; and a pivoting joint mechanism structured to pivot the spray head bottom portion relative to the spray head top portion about a pivot axis.

In Example 2, the spray head of Example 1 is modified in that the pivoting joint mechanism comprises: a rotary member and a stationary member, the rotary member coupled to the spray head bottom portion and configured to pivot about the pivot axis and the stationary member coupled to the spray head top portion and configured to remain stationary with the faucet when pivoted.

In Example 3, the spray head of Example 2 is modified in that one or more friction members are positioned between the rotary member and the stationary member structured to retain the spray head in a pivoted position.

In Example 4, the spray head of Example 1 is modified in that the spray head pivots about a single degree of freedom about the pivot axis.

In Example 5, the spray head of Example 1 is modified in that the spray head is normally in an unpivoted position along an unpivoted longitudinal axis and is structured to be pivoted between a first pivoted position along a first pivoted longitudinal axis and a second pivoted position along a second pivoted longitudinal axis, the unpivoted position between the first pivoted position and the second pivoted position.

In Example 6, the spray head of Example 5 is modified in that the first pivoted longitudinal axis and the second pivoted longitudinal axis are angularly displaced from the unpivoted longitudinal axis by 60 degrees.

In Example 7, the spray head of Example 5 is modified in that the first pivoted longitudinal axis and the second pivoted longitudinal axis are angularly displaced from the unpivoted longitudinal axis by 45 degrees.

In Example 8, the spray head of Example 5 is modified in that the first pivoted longitudinal axis and the second pivoted longitudinal axis are angularly displaced from the unpivoted longitudinal axis by 30 degrees.

In Example 9, the spray head of Example 1 is modified in that the spray head is pivotable in a range from 0 degrees to 120 degrees.

In Example 10, the spray head of Example 1 is modified in that the spray head is pivotable in a range from 0 degrees to 90 degrees.

In Example 11, the spray head of Example 1 is modified in that the spray head is pivotable in a range from 0 degrees to 60 degrees.

In Example 12, the spray head of Example 1 is modified in that a manifold is coupled to the spray head bottom portion and comprising a first diverter chamber housing at least a portion of a first diverter assembly configured to modulate water flow through the spray head.

In Example 13, the spray head of Example 12 is modified in that the first diverter assembly comprises a pause diverter assembly configured to selectively stop water from flowing through the outlet, the pause diverter assembly movable between an open pause diverter position and a closed pause diverter position.

In Example 14, the spray head of Example 13 is modified in that when the pause diverter assembly is in the open pause diverter position, water flows through the outlet, and when the pause diverter assembly is in the closed pause diverter position, water is stopped from flowing through the spray head.

In Example 15, the spray head of Example 12 is modified in that the first diverter assembly comprises a spray diverter assembly structured to divert water between at least two water flow paths and movable between an open spray diverter position and a closed spray diverter position.

In Example 16, the spray head of Example 15 is modified in that when the spray diverter assembly is in the open spray diverter position, water is diverted toward and through an aerator assembly and when the spray diverter assembly is in the closed spray diverter position, water is diverted toward and through a nozzle assembly.

In Example 17, the spray head of Example 12 is modified in that the manifold further comprises a second diverter chamber housing at least a portion of a second diverter assembly configured to modulate water flow through the spray head.

In Example 18, the spray head of Example 17 is modified in that the first diverter assembly comprises a pause diverter assembly and the second diverter assembly comprises a spray diverter assembly; wherein when the pause diverter assembly is in an open pause diverter position, water is permitted to flow through the outlet and when the pause diverter assembly is in a closed pause diverter position, water is stopped from flowing through the outlet; and wherein when the second diverter assembly is in an open spray diverter position, water is diverted toward and through an aerator assembly and when the second diverter assembly is in a closed spray diverter position, water is diverted toward and through a nozzle assembly.

In Example 19, the spray head of Example 18 is modified in that the nozzle assembly comprises a plurality of apertures creating a shower spray expelled through the outlet.

In Example 20, the spray head of Example 18 is modified in that the aerator assembly is structured to output an aerated stream of water expelled through the outlet.

In Example 21, a faucet comprises: a faucet spout having a first end and a second end; a faucet base coupled to the first end of the faucet spout; and a spray head coupled to the second end of the faucet spout and structured to expel water from the faucet, the spray head movable between an unpivoted position and a pivoted position.

In Example 22, the spray head of Example 21 is modified in that the spray head comprises: a spray head top portion comprising an inlet to receive water from the faucet spout and a spray head bottom portion comprising an outlet to expel water; and a pivoting joint mechanism structured to pivot the spray head bottom portion relative to the spray head top portion about a pivot axis.

In Example 23, the spray head of Example 22 is modified in that the pivoting joint mechanism comprises: a rotary member and a stationary member, the rotary member coupled to the spray head bottom portion and configured to pivot about the pivot axis and the stationary member coupled to the spray head top portion and configured to remain stationary with the faucet.

In Example 24, the spray head of Example 22 is modified in that the spray head pivots about a single degree of freedom about the pivot axis.

In Example 25, the spray head of Example 21 is modified in that the spray head is normally in an unpivoted position along an unpivoted longitudinal axis and is structured to be pivoted between a first pivoted position along a first pivoted longitudinal axis and a second pivoted position along a second pivoted longitudinal axis, the unpivoted position positioned between the first pivoted position and the second pivoted position.

In Example 26, the spray head of Example 25 is modified in that the first pivoted longitudinal axis and the second pivoted longitudinal axis are angularly displaced from the unpivoted longitudinal axis by 60 degrees.

In Example 27, the spray head of Example 25 is modified in that the first pivoted longitudinal axis and the second pivoted longitudinal axis are angularly displaced from the unpivoted longitudinal axis by 45 degrees.

In Example 28, the spray head of Example 25 is modified in that the first pivoted longitudinal axis and the second pivoted longitudinal axis are angularly displaced from the unpivoted longitudinal axis by 30 degrees.

In Example 29, the spray head of Example 21 is modified in that the spray head is pivotable in a range from 0 degrees to 120 degrees.

In Example 30, the spray head of Example 21 is modified in that the spray head is pivotable in a range from 0 degrees to 90 degrees.

In Example 31, the spray head of Example 21 is modified in that the spray head is pivotable in a range from 0 degrees to 60 degrees.

In Example 32, the spray head of Example 21 is modified in that the spray head is movable between a docked position in which the spray head is coupled to the faucet spout and an undocked position in which the spray head is decoupled to the faucet spout.

In Example 33, the spray head of Example 32 is modified in that the spray head is movable between the unpivoted position and the pivoted position when in the docked position.

In Example 34, the spray head of Example 21 is modified in that the spray head further comprises one or more diverter assemblies selectable by a user to modulate an output water flow from the outlet of the spray head.

In Example 35, the spray head of Example 34 is modified in that the one or more diverter assemblies comprise a pause diverter assembly movable between an open position and a closed position; wherein when the pause diverter assembly is in the closed position, the pause diverter assembly closes a pathway within the spray head to prevent water flow through the outlet.

In Example 36, the spray head of Example 35 is modified in that when in the open position, the pause diverter assembly opens the pathway within the spray head to allow water flow through the outlet.

In Example 37, the spray head of Example 34 is modified in that the one or more diverter assemblies comprise a spray diverter assembly movable between an open position and a closed position; wherein when the spray diverter assembly is in the closed position, the spray diverter assembly closes a pathway within the spray head to divert water flow away from an aerator flow path and into a nozzle flow path creating a shower spray expelled from the outlet.

In Example 38, the spray head of Example 37 is modified in that when the spray diverter assembly is in the open position, the spray diverter assembly opens the pathway within the spray head to divert water flow toward the aerator flow path and away from the nozzle flow path creating an aerator stream expelled from the outlet.

In Example 39, a spray head for connection to a faucet for expelling water comprises: a spray head top portion comprising an inlet to receive water from the faucet and a spray head bottom portion comprising an outlet to expel water; and a pivoting joint mechanism structured to pivot the spray head bottom portion relative to the spray head top portion about a pivot axis, wherein the pivoting joint mechanism comprises a detent structured to maintain the spray head in an unpivoted position.

In Example 40, a spray head for connection to a faucet for expelling water comprises: a spray head top portion comprising an inlet to receive water from the faucet and a spray head bottom portion comprising an outlet to expel water; and a pivoting joint mechanism structured to allow the spray head bottom portion to pivot relative to the spray head top portion about a single degree of freedom.

In Example 41, a spray head for connection to a faucet for expelling water, comprises: a spray head top portion comprising an inlet to receive water from the faucet and a spray head bottom portion comprising an outlet to expel water and a manifold; and a pivoting joint mechanism structured to allow the spray head bottom portion to pivot relative to the spray head top portion about a single degree of freedom, the pivoting joint mechanism comprising: a stationary member coupled to the spray head top portion and having a post defining a chamber therein; and a rotary member coupled to the manifold of the spray head bottom portion and having a groove, the groove receiving at least a portion of the post and the rotary member rotatable relative to the stationary member, wherein the chamber is in fluid communication with the manifold.

In Example 42, a spray head for connection to a faucet for expelling water comprises: a spray head top portion comprising an inlet to receive water from the faucet and a spray head bottom portion comprising an outlet to expel water; and a pivoting joint mechanism structured to allow the spray head bottom portion to pivot relative to the spray head top portion, the pivoting joint mechanism comprising: a shroud spanning between the spray head top portion and the spray head bottom portion; a ball joint body having a substantially spherical outer surface, the spherical outer surface disposed within the shroud; and a collar configured to capture at least a portion of the spherical outer surface, wherein the collar restricts rotation of the spray head bottom portion relative to the spray head top portion around a longitudinal axis while allowing pivoting movement between the spray head bottom portion and the spray head top portion.

In Example 43, the spray head of Example 42 is modified in that the spherical outer surface includes at least one axial groove and at least one circumferential groove, the collar including at least one pin that extends into the at least one axial groove and at least one roller ball extending into the at least one circumferential groove.

In Example 44, the spray head of Example 43 is modified in that the at least one roller ball is biased and when the spray head bottom portion pivots, the at least one roller ball is positioned out of the at least one circumferential groove.

In Example 45, the spray head of Example 43 is modified in that the at least one pin remains within the at least one axial groove when the spray head bottom portion pivots.

In Example 46, the spray head of Example 43 is modified in that the at least one roller ball provides feedback when the spray head bottom portion is centered.

In Example 47, the spray head of Example 46 is modified in that the feedback is tactile or audible.

In Example 48, the spray head of Example 42 is modified in that at least one manifold is disposed within the spray head bottom portion, the collar sitting directly on the at least one manifold.

In Example 49, the spray head of Example 48 is modified in that the shroud engages with the at least one manifold to compress the collar against the at least one manifold.

In Example 50, the spray head of Example 42 is modified in that the pivoting joint mechanism further includes a seal and a spring, the seal positioned against a lower portion of the spherical outer surface and biased in an upward direction on the longitudinal axis via the spring.

In Example 51, a spray head for connection to a faucet for expelling water comprises: a spray head top portion comprising an inlet to receive water from the faucet and a spray head bottom portion comprising an outlet to expel water, the spray head bottom portion including a manifold; and a pivoting joint mechanism structured to allow the spray head bottom portion to pivot relative to the spray head top portion, the pivoting joint mechanism comprising: a shroud spanning between the spray head top portion and the spray head bottom portion; a ball joint body having a nut member and a ball member, the ball member forming a substantially spherical outer surface, the spherical outer surface disposed within the shroud; a top bushing; and a bottom seal, wherein the spherical outer surface is captured between the top bushing and the bottom seal allowing the spray head bottom portion to pivot relative to the spray head portion, the top bushing sitting directly on the manifold.

In Example 52, a ball joint comprises: a ball joint body having a substantially spherical outer surface disposed at one end, the ball joint body having a through opening configured to receive a flow of water; and a seal assembly comprising: a spring; and a seal, the seal biased by the spring to sealing engage the spherical outer surface of the ball joint body, wherein the spring generates a spring force on the spherical outer surface that defines a consistent ball actuation force on the ball joint body during actuation of the ball joint.

In Example 53, the ball joint of Example 52 is further modified to include a manifold having an inner chamber configured to support the seal assembly.

In Example 54, the ball joint of Example 53 is further modified to include a shroud configured to couple to the manifold and capture at least a portion of the spherical outer surface between the shroud and the manifold, wherein the shroud engages with the manifold to transfer torque loads away from the seal assembly and into the shroud.

In Example 55, the ball joint of Example 52 is further modified in that it is included in a spray head of a faucet.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

References in the specification to "one embodiment," "an embodiment," "an illustrative embodiment," "an example," "an aspect," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

What is claimed is:

1. A spray head for a faucet comprising:

an inlet configured to couple to a faucet hose; and an outer housing including:

a first housing portion coupled to the inlet and defining a longitudinal axis; and a second housing portion housing a manifold and an outlet configured to expel water from the spray head, the second housing portion pivotable relative to the first housing portion about a pivot axis orthogonal to the longitudinal axis between at least a home position and at least one pivoted position, wherein when the second housing portion is in the home position, an exterior surface of the second housing portion axially aligns with an exterior surface of the first housing portion along the longitudinal axis such that the outer housing has a generally tubular shape.

2. The spray head of claim 1, wherein the first housing portion includes a bottom edge facing the second housing portion and the second housing portion includes a top edge facing the first housing portion, the top and bottom edges having substantially arcuate shapes.

3. The spray head of claim 2, wherein the top and bottom edges mate at a seam that extends circumferentially around the outer housing, and wherein the first housing portion and the second housing portion have a uniform appearance across the seam when the second housing portion is in the home position.

4. The spray head of claim 2, wherein the top and bottom edges mate at a seam that extends circumferentially around the outer housing, and wherein the seam has a pair of lowest points relative to the outlet that align with the pivoting direction of the second housing portion.

5. The spray head of claim 4, further comprising at least one actuator control for at least partially controlling a flow of water through the outer housing, wherein the at least one actuator control is axially aligned with one of the pair of lowest points of the seam along the longitudinal axis.

6. The spray head of claim 1, further comprising a pivoting joint mechanism disposed within the outer housing, the pivoting joint mechanism having a stationary member coupled to the first housing portion and a rotary member coupled to the second housing portion.

7. The spray head of claim 6, further comprising a first seal disposed at least partially between the stationary member and the rotary member, and a second seal disposed at least partially between the manifold and the rotary member, the first and second seals configured to generate fiction on the rotary member to maintain the second housing portion in the at least one pivoted position.

8. The spray head of claim 7, wherein the first and second seals extend around the pivot axis.

9. The spray head of claim 6, wherein the stationary member defines a flow conduit configured to channel water through the pivoting joint mechanism, the flow conduit having a first chamber portion that is parallel with the longitudinal axis and a second chamber portion that is parallel with the pivot axis.

10. The spray head of claim 9, wherein the manifold includes a first diverter assembly and a second diverter assembly, the first diverter assembly downstream of the second chamber portion and configured to control water flow through the manifold, and the second diverter assembly upstream of the outlet and configured to control water flow out of the outlet, wherein the first diverter assembly is discrete from the second diverter assembly.

11. A spray head for a faucet comprising:

an inlet configured to couple to a faucet hose;

a first housing portion coupled to the inlet and defining a longitudinal axis;

a second housing portion housing a manifold and an outlet configured to expel water from the spray head; and a pivoting joint mechanism including a stationary member coupled to the first housing portion and a rotary member coupled to the second housing portion, the pivoting joint mechanism allowing the second housing portion to pivot relative to the first housing portion around a pivot axis orthogonal to the longitudinal axis, wherein the stationary member has a post that extends at least partially into the second housing portion and pivotably engages with at least the rotary member, and wherein the pivotable engagement between the stationary member and the rotary member is configured to hold a pivot position of the spray head.

12. The spray head of claim 11, wherein the post of the stationary member includes a first seal disposed between the stationary member and the rotary member and a second seal disposed between the stationary member and the manifold, the first and second seals generating a friction force for holding the pivot position of the spray head.

13. The spray head of claim 11, wherein the rotary member defines opposing stop ends for the post of the stationary member defining a pivot angle for the second housing portion relative to the longitudinal axis.

14. The spray head of claim 11, wherein the first housing portion includes a bottom edge facing the second housing portion and the second housing portion includes a top edge facing the first housing portion, the top and bottom edges having substantially arcuate shapes.

15. The spray head of claim 14, wherein when the second housing position is aligned with the first housing portion along the longitudinal axis, an outer housing of the spray head has a generally tubular shape.

16. A spray head for a faucet comprising:

an inlet configured to couple to a faucet hose;

a first housing portion coupled to the inlet and defining a longitudinal axis;

a second housing portion housing a manifold and an outlet configured to expel water from the spray head; and a pivoting joint mechanism including a stationary member coupled to the first housing portion and a rotary member coupled to the second housing portion, the pivoting joint mechanism allowing the second housing portion to pivot relative to the first housing portion around a pivot axis orthogonal to the longitudinal axis, wherein the stationary member has a post that extends at least partially into the second housing portion and pivotably engages with at least the rotary member, and wherein the post defines a flow conduit configured to channel water through the pivoting joint mechanism, the flow conduit having a first chamber portion that is parallel with the longitudinal axis and a second chamber portion that is parallel with the pivot axis.

17. The spray head of claim 16, wherein the manifold includes a first diverter assembly and a separate second diverter assembly, both downstream of the second chamber portion of the flow conduit, and wherein the first diverter assembly is configured to selectively block fluid flow through the manifold and the second diverter assembly is configured to define an outlet flow path for the water though the outlet.

18. The spray head of claim 17, wherein the first diverter assembly is actuatable along a diverter axis that is orthogonal to both the longitudinal axis and the pivot axis.

19. The spray head of claim 16, wherein the first housing portion includes a bottom edge facing the second housing portion and the second housing portion includes a top edge facing the first housing portion, the top and bottom edges having substantially arcuate shapes.

20. The spray head of claim 19, wherein when the second housing position is aligned with the first housing portion along the longitudinal axis, an outer housing of the spray head has a generally tubular shape.

* * * * *